United States Patent
Yui et al.

(10) Patent No.: US 7,154,558 B2
(45) Date of Patent: Dec. 26, 2006

(54) DISPLAY CONTROL APPARATUS AND METHOD, AND RECORDING MEDIUM AND PROGRAM THEREFOR

(75) Inventors: Hideaki Yui, Kanagawa (JP); Takashi Tsunoda, Kanagawa (JP); Makoto Uehara, Kanagawa (JP); Toshiaki Itazawa, Kanagawa (JP); Eiichi Matsuzaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 569 days.

(21) Appl. No.: 10/152,022

(22) Filed: May 22, 2002

(65) Prior Publication Data

US 2002/0196367 A1    Dec. 26, 2002

(30) Foreign Application Priority Data

May 25, 2001    (JP) .............................. 2001-157340

(51) Int. Cl.
*H04N 5/45* (2006.01)
*H04N 9/74* (2006.01)

(52) U.S. Cl. ...................... 348/565; 348/564; 348/580; 348/584; 348/585; 348/588; 348/598

(58) Field of Classification Search ................ 348/561, 348/563–566, 580–582, 584–588, 598–599; *H04N 5/45, H04N 9/74*
See application file for complete search history.

(56) References Cited

U.S. PATENT DOCUMENTS

| | | | | |
|---|---|---|---|---|
| 4,984,082 A | * | 1/1991 | Okamura ..................... | 348/565 |
| 5,146,335 A | * | 9/1992 | Kim et al. ................... | 348/564 |
| 5,398,074 A | * | 3/1995 | Duffield et al. .............. | 348/564 |
| 5,442,406 A | * | 8/1995 | Altmanshofer et al. ..... | 348/588 |
| 5,506,628 A | * | 4/1996 | Chun .......................... | 348/565 |
| 5,621,429 A | * | 4/1997 | Yamaashi et al. ........... | 715/803 |
| 5,754,253 A | * | 5/1998 | Lee ............................. | 348/565 |
| 5,900,868 A | * | 5/1999 | Duhault et al. .............. | 725/42 |
| 5,956,094 A | * | 9/1999 | Chun ........................... | 348/564 |
| 5,978,046 A | * | 11/1999 | Shintani ..................... | 348/589 |
| 6,069,662 A | * | 5/2000 | Horiuchi et al. ............ | 348/446 |
| 6,154,203 A | | 11/2000 | Yuen et al. .................. | 345/327 |
| 6,177,931 B1 | | 1/2001 | Alexander et al. .......... | 345/327 |
| 6,204,887 B1 | * | 3/2001 | Hiroi ........................... | 348/565 |
| 6,281,940 B1 | * | 8/2001 | Sciammarella .............. | 348/564 |
| 6,295,646 B1 | * | 9/2001 | Goldschmidt Iki et al. ... | 725/41 |
| 6,377,715 B1 | * | 4/2002 | Fujieda et al. .............. | 382/314 |
| 6,384,868 B1 | * | 5/2002 | Oguma ........................ | 348/564 |
| 6,456,334 B1 | * | 9/2002 | Duhault ....................... | 348/565 |
| 6,469,746 B1 | * | 10/2002 | Maida .......................... | 348/564 |
| 6,493,038 B1 | * | 12/2002 | Singh et al. ................. | 348/565 |
| 6,556,253 B1 | * | 4/2003 | Megied et al. .............. | 348/565 |
| 6,732,371 B1 | * | 5/2004 | Lee et al. ..................... | 725/41 |
| 6,784,945 B1 | * | 8/2004 | Norsworthy et al. ........ | 348/731 |
| 6,791,623 B1 | * | 9/2004 | Masuda et al. ............. | 348/563 |
| 6,803,968 B1 | * | 10/2004 | Numata ....................... | 348/584 |

(Continued)

FOREIGN PATENT DOCUMENTS

EP    1 024 661 A2    8/2000

(Continued)

*Primary Examiner*—Brian P. Yenke
(74) *Attorney, Agent, or Firm*—Fitzpatrick, Cella, Harper & Scinto

(57) ABSTRACT

A display control apparatus includes a display controller for receiving image signals corresponding to a plurality of images, to perform image processing on the image signals, and to synthesize images corresponding to the thus-processed image signals. While the images are displayed in a main picture and a sub-picture, the display controller further displays, adjacently to the sub-picture, a list of a plurality of images.

4 Claims, 17 Drawing Sheets

U.S. PATENT DOCUMENTS

| | | |
|---|---|---|
| 6,809,776 B1 * | 10/2004 | Simpson ..................... 348/565 |
| 6,870,573 B1 * | 3/2005 | Yeo et al. ................... 348/569 |
| 6,933,955 B1 * | 8/2005 | Crocitti et al. .............. 345/666 |
| 6,941,574 B1 * | 9/2005 | Broadwin et al. ............ 725/37 |
| 2001/0008427 A1 * | 7/2001 | Seo ............................ 348/565 |
| 2001/0033340 A1 * | 10/2001 | Yui ............................ 348/592 |
| 2002/0033899 A1 * | 3/2002 | Oguma ....................... 348/565 |
| 2002/0075407 A1 * | 6/2002 | Cohen-Solal ............... 348/565 |
| 2003/0056215 A1 * | 3/2003 | Kanungo .................... 725/38 |
| 2004/0107438 A1 * | 6/2004 | Sekiguchi et al. ............ 725/43 |
| 2005/0012863 A1 * | 1/2005 | Yui ............................ 348/592 |
| 2005/0162556 A1 * | 7/2005 | Desai ......................... 348/564 |

FOREIGN PATENT DOCUMENTS

| | | |
|---|---|---|
| EP | 1 052 849 A1 | 11/2000 |
| JP | 2-96486 A | 4/1990 |
| JP | 10-51709 A | 2/1998 |
| WO | WO 00/46988 | 8/2000 |

* cited by examiner

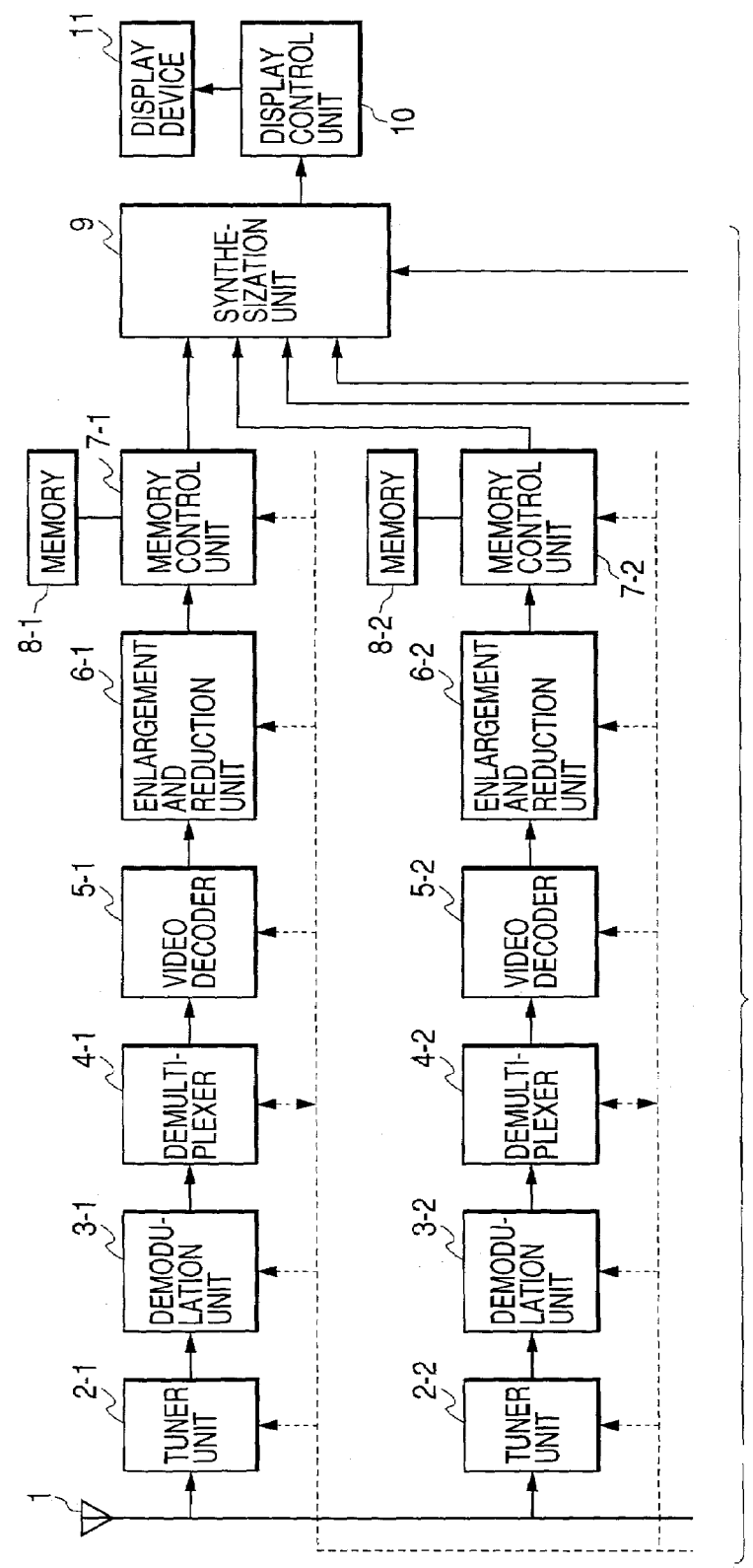

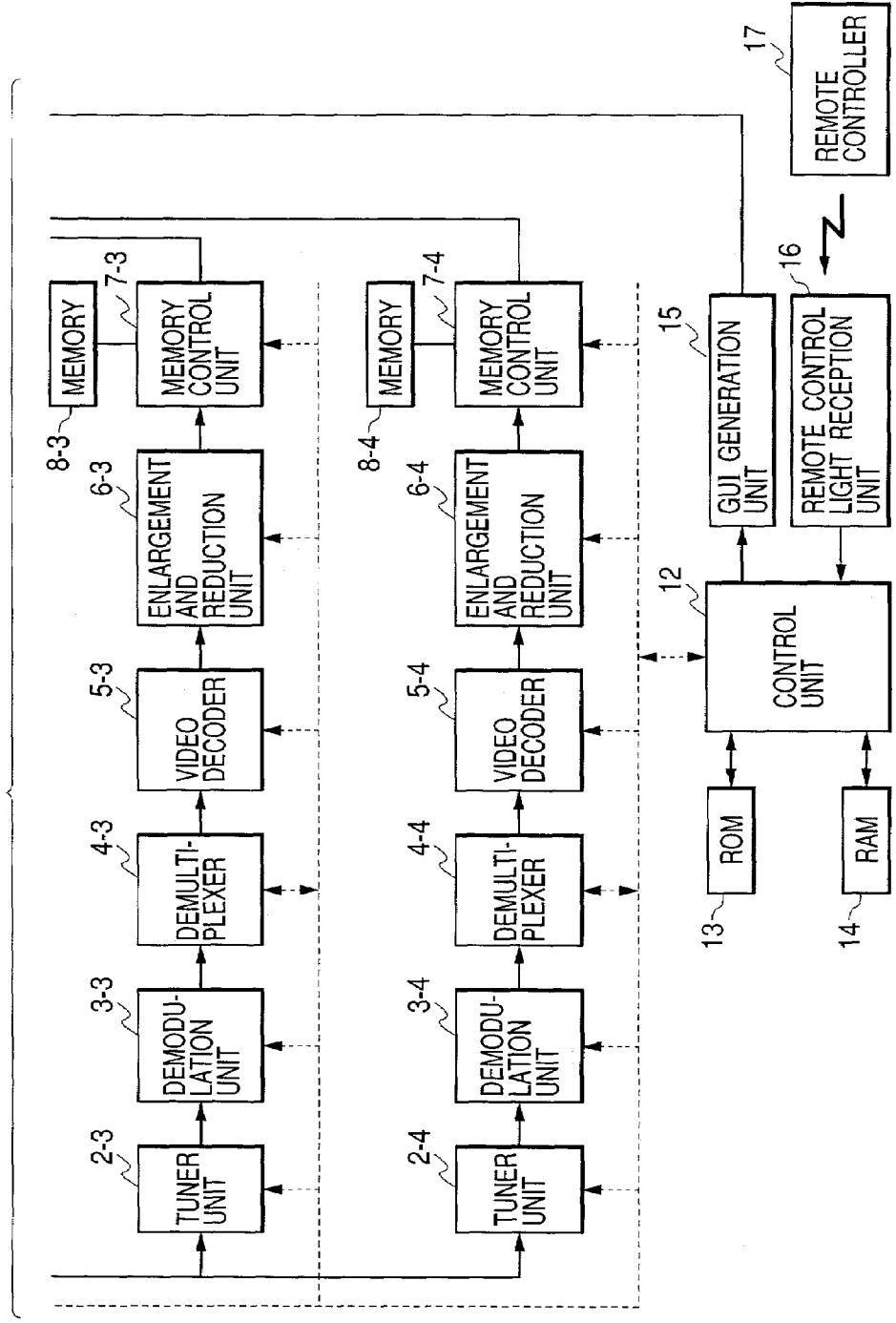

CHILD PICTURE 1   MAIN PICTURE

CHILD PICTURE 2

FIG. 8A
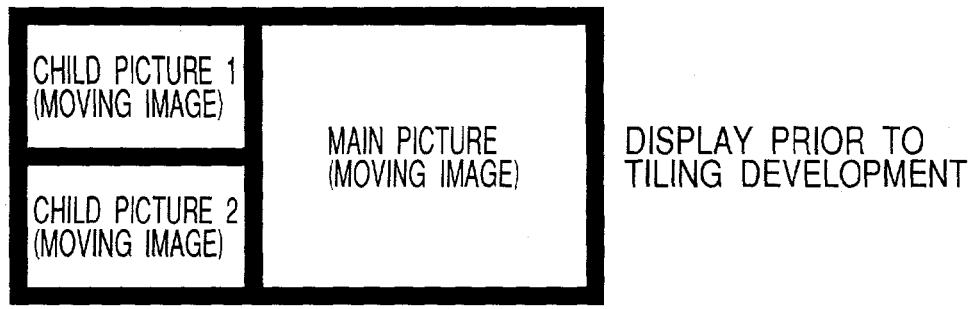
DISPLAY PRIOR TO TILING DEVELOPMENT
FIG. 8B
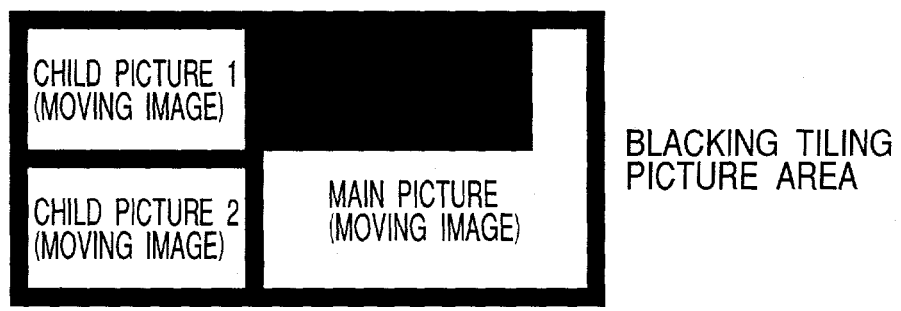
BLACKING TILING PICTURE AREA
FIG. 8C
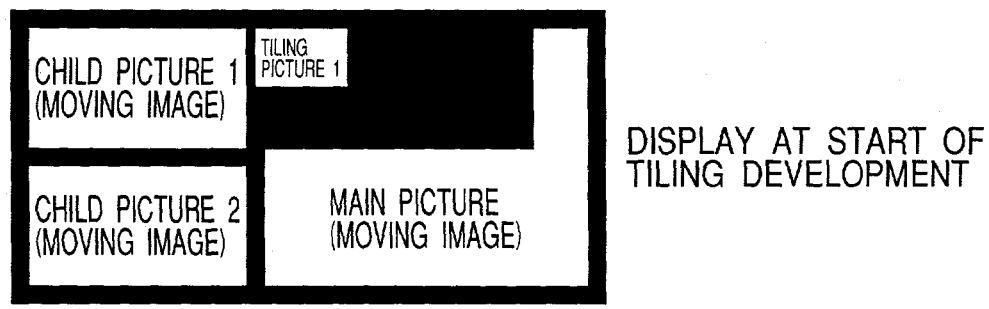
DISPLAY AT START OF TILING DEVELOPMENT
FIG. 8D
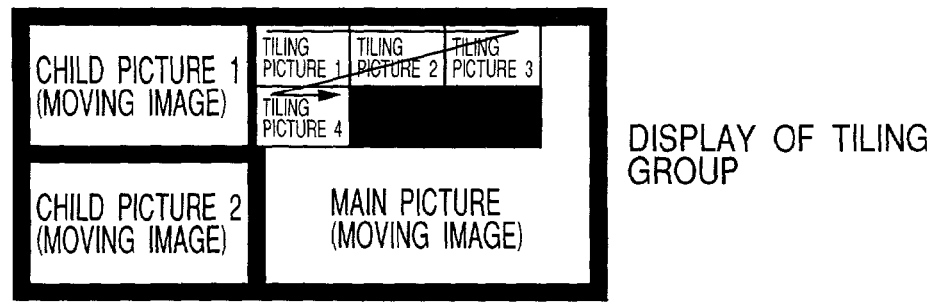
DISPLAY OF TILING GROUP

CASE OF REPLACING TILING FOCUS PICTURE WITH CHILD PICTURE

CASE OF REPLACING TILING FOCUS PICTURE WITH MAIN PICTURE

CASE OF DELETING TILING FOCUS PICTURE FROM ENTRY PROGRAM

↓ SELECTING "GO"   ↑ SELECTING "BACK"

DISPLAY CONTROL APPARATUS AND METHOD, AND RECORDING MEDIUM AND PROGRAM THEREFOR

BACKGROUND OF THE INVENTION

1. Field of the Invention

The present invention relates to a display control apparatus, and a method therefor, for enabling the display of a plurality of images by using a main picture and at least one child picture.

2. Related Background Art

As well known, a presently-available television reception unit can display not only a main picture but also, as a child picture, an additional analog broadcast program image. An example television reception unit that includes such a function is disclosed in Japanese Laid-Open Patent Application No. 2-96486. In addition, a recently-introduced multi-picture television reception unit, now in practical use, divides a child picture to obtain a plurality of picture segments, corresponding in number to the available broadcast programs, and incorporates a single-tuner-controlled time sharing process for cyclically displaying moving images in the picture segments. Furthermore, with another television reception unit that has come into practical use, a user registers favorite programs in advance and the programs to be displayed are then selected in accordance with the registered contents. An example television reception unit that includes such a function is disclosed in Japanese Laid-Open Patent Application No. 10-51709.

Relative to digital broadcasting, a service called EPG (Electrical Program Guide) has been practically employed that can cope with multi-channel broadcasts. By employing this service, program information obtained from digital broadcasts can be displayed on a screen, and from the displayed information a user can select whichever of the programs he or she desires to watch.

As in the conventional examples, a multi-picture display system, which divides a child picture to obtain a plurality of picture segments, corresponding in number to the programs being broadcast, and displays a program list, can satisfactorily cope with analog broadcasting for which several tens of channels are available. However, for multi-channel digital broadcasting, for which several hundred channels are available, it is difficult for this system to divide a child picture to obtain picture segments for all the channels. Furthermore, the display resolution of the program video is reduced because of the increase in the number of picture segments, and visibility of a video image is deteriorated.

When a user has registered his or her favorite programs in advance, in order thereafter to view any of the favorite registered programs (hereinafter referred to as entry programs) as a child picture, the user need only employ a remote controller to switch to a selected picture segment. However, when a user employs this function to search for and view a favorite broadcast program, the following problem is encountered. Since the programs to be switched to are displayed in order in accordance with priority levels established at the time programs are registered, and the display switching operation must be repetitively performed to bring up a desired program having a low priority level, thereby requiring a user a troublesome operation when a user desires to immediately display a target program. Such repetitive switching becomes especially irritating when multi-channel digital broadcasting is employed, since many entry programs may be registered and the likelihood is great that the number of switching operations will be increased, and as a result, a demand for improved program selection procedures and devices has been raised.

Further, while digital broadcasting EPG is known as a preferable program selection means for users who have programs they wish to view, or for those who are familiar with computers, the EPG can be a very inconvenient and troublesome selection means for users who desire to choose programs while viewing pictures, or for those who are not familiar with computers, because the operating sensation users experience when selecting programs with the EPG, differs greatly from that experienced when analog broadcasting is employed.

SUMMARY OF THE INVENTION

To resolve these shortcomings, it is one objective of the present invention to provide a display control apparatus, and a method therefor, whereby without deteriorating the visibility of a program that is currently being displayed as a child picture, other program videos can be easily identified.

It is another objective of the present invention to provide a display control apparatus, and a method therefor, whereby the boundary between a main picture and a tiling development picture is clearly displayed.

It is an additional objective of the present invention to provide a display control apparatus, and a method therefor, whereby multiple programs can be efficiently displayed in a tiling development picture, even when the number of programs to be displayed in the tiling development picture is greater than the maximum number of tiling development picture segments that are available.

It is a further objective of the present invention to provide a display control apparatus, and a method therefor, whereby, while a tiling development picture is being displayed, a user can view the video of the main picture without experiencing a sensation of oppression.

To achieve these objectives, according to one aspect of the present invention, a display control apparatus for controlling display means to display a plurality of images in a main picture and at least one sub-picture, comprises:

input means for entering image signals related to the plurality of images;

image processing means for performing image processing on the image signals entered by the input means; and display control means for synthesizing images corresponding to the image signals processed by the image processing means, and for displaying the synthesized images in the main picture and the sub-picture, wherein, while displaying the synthesized images in the main picture and the sub-picture, the display control means displays a list of the plurality of images adjacently to the sub-picture.

The other objectives and features of the present invention will become more apparent during the course of the detailed description of the present invention, which is given while referring to the accompanying drawings.

BRIEF DESCRIPTION OF THE DRAWINGS

FIG. 1 is comprised of FIG. 1A and FIG. 1B showing schematic block diagrams illustrating the configuration of a multi-picture display apparatus according to a first embodiment of the present invention;

FIGS. 8A, 8B, 8C and 8D are diagrams showing the tiling development processing for an entry program according to the first embodiment of the present invention;

DESCRIPTION OF THE PREFERRED EMBODIMENTS

Figure 2:
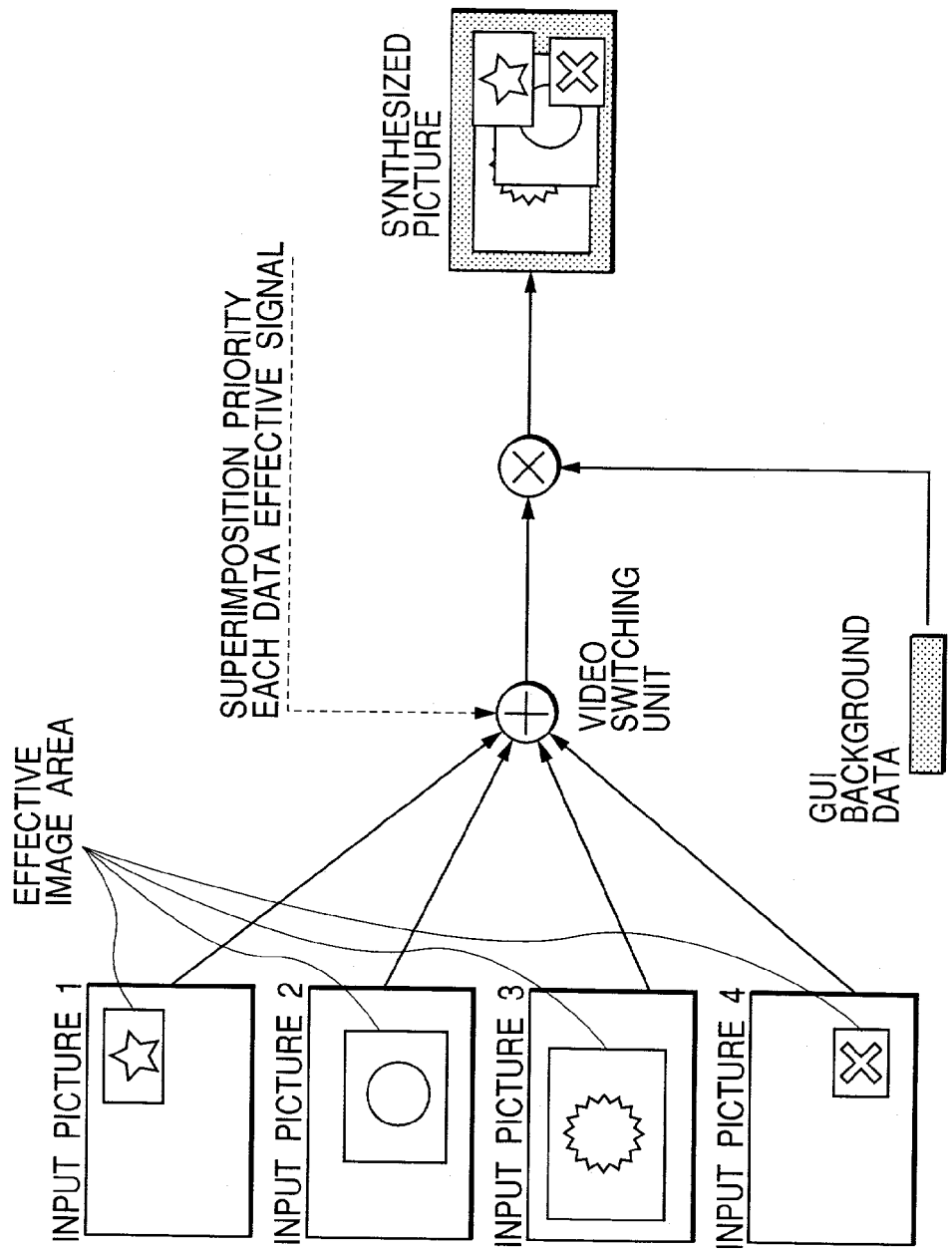
FIG. 2 is a diagram for explaining a superimposition synthesis method employed by the multi-picture display apparatus according to the first embodiment of the present invention.

The preferred embodiments of the present invention will now be described in detail while referring to the accompanying drawings.

FIGS. 1A and 1B are schematic block diagrams showing the configuration of a multi-picture display apparatus according to a first embodiment of the present invention. The multi-picture display apparatus in FIGS. 1A and 1B is so arranged that, based on a predetermined layout, it synthesizes and displays four independent program video sources. It should be noted that the number of program video sources to be synthesized and displayed is not limited to four, and may be larger or smaller.

The configuration of the multi-picture display apparatus in this embodiment will now be described in detail while referring to FIGS. 1A and 1B. BS digital broadcasts and CS digital broadcasts are received at an antenna 1 (parabola antenna). In this embodiment, satellite broadcasting is employed; however, a broadcast program may be received through a ground wave or an optical cable.

Tuner units 2-1 to 2-4 pass a wave received at the antenna 1 through incorporated band-pass filters or down converters, and output it to demodulation units 3-1 to 3-4. The demodulation units 3-1 to 3-4 perform on the received wave, a demodulation process that matches the modulation performed on the transmission side, performs an error correction process on a desired transport stream (hereinafter referred to as a TS), and transmits the resultant TS to demultiplexers 4-1 to 4-4. This TS is so arranged that multiple program packets coded using MPEG-2, for example, are multiplexed.

The demultiplexers 4-1 to 4-4 separate from the desired TS, video data, audio data and additional information of a desired program. The obtained audio data is decoded using an audio decoder (not shown), and the obtained audio signal is output. When an amplifier and a loudspeaker are connected to the audio decoder, the sound produced from a received program can be heard.

The video data separated from the TS is decoded using video decoders 5-1 to 5-4, and the decoded data is converted into data having a raster scan display format, which is then transmitted as a program video source to enlargement and reduction units 6-1 to 6-4.

The additional information is then transmitted to a control unit 12. And when the additional information is data for BS digital broadcasting, the control unit 12 interprets the BML (Broadcast Markup Language) and obtains a contents scenario structured by a multimedia information service provider. Whereas when the additional information is EPG (Electrical Program Guide) information, the control unit 12 obtains program information (e.g., a program, an on-air time, a title and a category) by interpreting the PSI/SI information.

When the pre-process is performed on video data by a matrix circuit for converting a YUV color difference signal into an RGB signal, an I-P conversion circuit for converting the scan type from interlace to progressive, and other circuits, and when the control unit 12 sets a display format (the number of displayed lines, the number of dots and the number of colors) and resolution conversion parameters (an enlargement rate, a reduction rate, a weighting filter coefficient for enlargement and reduction, etc.) based on picture layout information that is set up in advance, the enlargement and reduction units 6-1 to 6-4 perform the enlargement, reduction or equal magnification of the video data obtained through the pre-process.

Memory control units 7-1 to 7-4 write to memories 8-1 to 8-4, video data received from the enlargement and reduction units 6-1 to 6-4 at the input rate (a transfer rate synchronized with the horizontal and vertical sync signals on the input side). At the same time, the memory control units 7-1 to 7-4 read out video data from the memories 8-1 to 8-4 at the rate for the output of data from a synthesization unit 9 to a display device 11 in FIGS. 1A and 1B (a display rate synchronized with the horizontal and vertical sync signals on the output side). These writing and reading processes are fully asynchronously.

The operation of the memory control units 7-1 to 7-4 is performed based on memory control parameters (input data capture areas and output data reading areas in the memories 8-1 to 8-4) that are set by the control unit 12.

The size of each of the memories 8-1 to 8-4 is the equivalent of at least one picture on the display device 11. The synthesization unit 9 is an arithmetic operation unit for synthesizing video data that are, at the least, equivalent to two of the pictures that are read from the memory control units 7-1 to 7-4, which are independently operated. In this embodiment, all the video data are output by the synthesization unit 9 at a common timing synchronizing with of the horizontal and vertical sync signals of the display device 11. The data area to be transferred during one frame is the same as the actual image display area.

The method described above is one means employed to easily align the positions of images when the video data supplied by four video sources are synthesized. Further, the effective data area of the video data that is transmitted to the synthesization unit 9 for each video source can be identified by using an effective data signal that, together with video data, is received from the memory control units 7-1 to 7-4 during a horizontal time period.

FIG. 2 is a diagram showing an image representing a synthesized picture provided by the synthesization unit 9. The picture synthesizing process performed by the synthesization unit 9 will now be described while referring to FIG. 2. When the video data received from the memory control units 7-1 to 7-4 have the effective image areas shown in input pictures 1 to 4 in FIG. 2, the synthesization unit 9 monitors data effective signals that are received, together with the video data, from the memory control units 7-1 to 7-4, and selects and outputs only the video data for which the data effective signal is rendered active.

Especially when two or more data effective signals are simultaneously rendered active, the synthesization unit 9 initiates the synthesization of video data. At this time, since the control unit 12 determines display priority levels for the superimposition based on the picture layout information and the determined priority levels are set up in the synthesization unit 9, the video data synthesization performed by the synthesization unit 9 is based on the display priority levels. As a result, the synthesized video data are used to obtain a synthesized picture.

The control unit 12 controls a GUI (Graphical User Interface) generation unit 15 to generate OSD data as GUI data that are then output to the synthesization unit 9, whereat the GUI data (GUI background data) are further synthesized with the synthesized video data to prepare a background picture. As a result, the synthesized picture shown in FIG. 2 can be generated. While in this embodiment the GUI background data is synthesized with the synthesized video data, EPG picture data or other operating support picture data may be so synthesized.

A display control unit 10 controls the display, and converts a display format, in accordance with the characteristic of the display device 11. Further, the display control unit 10 includes an output timing generator. This output timing generator, whose main function is the generation of a timing control signal for the display device 11, employs a reference clock to generate a horizontal sync signal and a vertical sync signal that are output to the display device 11, and that are also transmitted to the synthesization unit 9.

The display device 11 that can be applied to the present invention can be any type of display device, such as a flat panel (liquid crystal, plasma, etc.) or a CRT having a matrix electrode structure, on which an image can be displayed. While taking into account that the display device 11 is employed for the application in this embodiment, a visual wide-field high definition display device is especially preferable on which a high-definition image of 720 P or higher can be displayed.

The control unit 12, which controls the entire system, includes a RAM 14 for temporarily storing data processed by a CPU, a ROM 13 for storing a control program, a counter for measuring a time (not shown), and a peripheral input/output interface (not shown).

The control unit 12 that can be applied to this embodiment may be constituted either by only logical units, or by a CPU or a media processor that can perform parallel processing. The control program may be stored in the ROM 13, or may be transmitted from the outside through the peripheral input/output interface.

A remote control light reception unit 16 is connected to the control unit 12 to accept a command transmitted by a remote controller 17 using infrared light. With the remote controller 17, an operation initiated by a user (a user action) can be accepted.

The operation of the multi-picture display apparatus according to this embodiment will now be described in detail by using the reference numerals of the individual components. All the flowcharts to be explained represent operations performed by the control unit 12.

Figure 3:
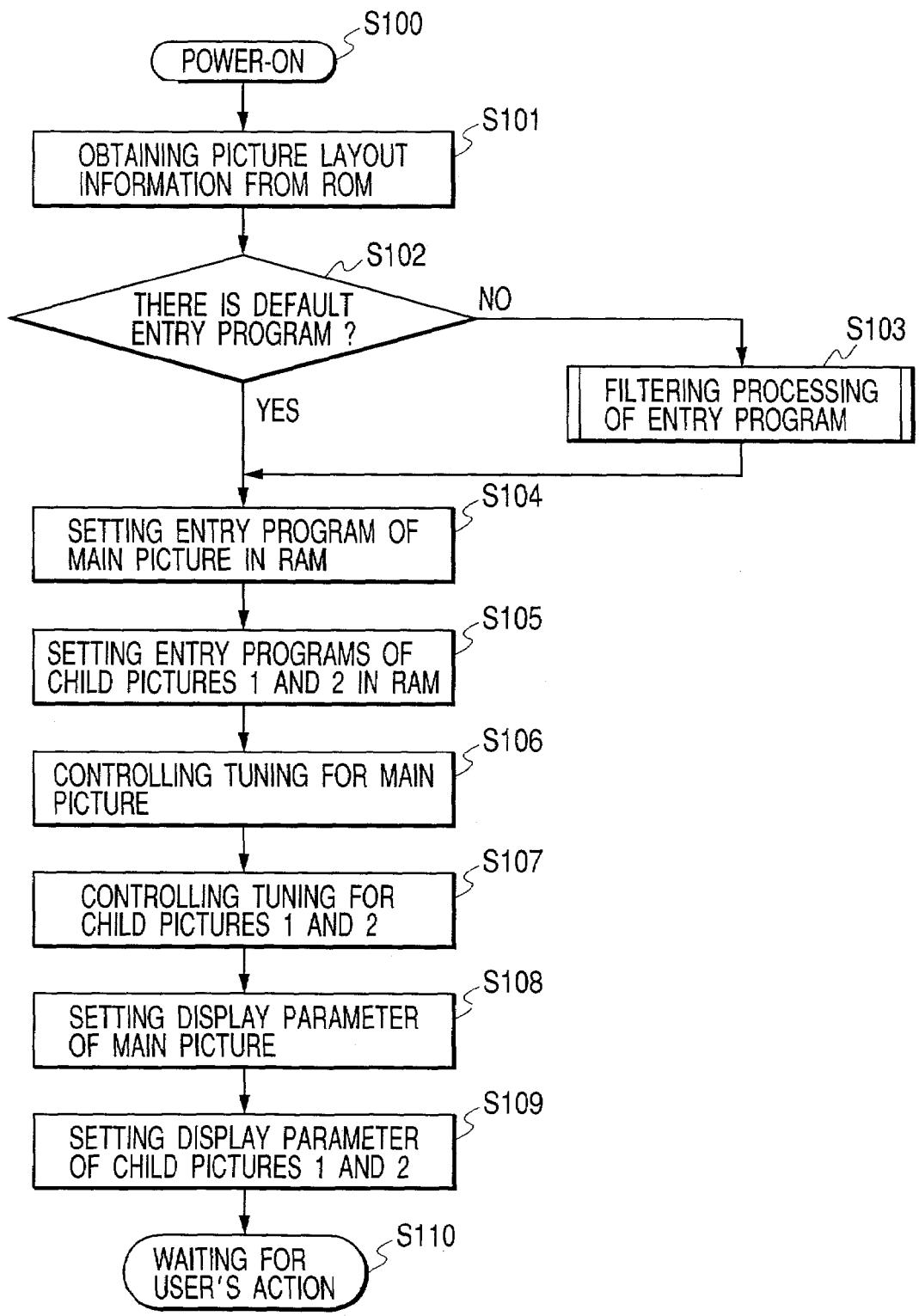
FIG. 3 is a flowchart showing the initialization processing performed by the multi-picture display apparatus according to the first embodiment of the present invention.
Figure 5:
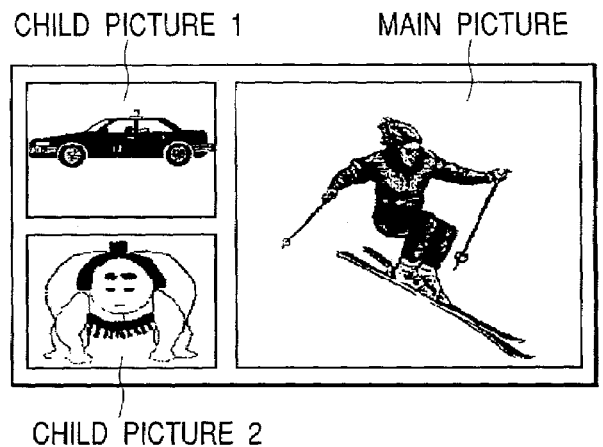
FIG. 5 is a diagram showing an example multi-picture layout according to the first embodiment of the present invention.

FIG. 3 is a flowchart showing the system initialization processing perfomed when the system is powered on. When at step S100 the control unit 12 detects the power on state, the control unit 12 obtains picture layout information from the ROM 13 (step S101). The picture layout information refers to the layout for the screen of the main picture, child pictures and a tiling development picture. The picture layout in FIG. 5 is based on the assumption that, while viewing a favorite program in the main picture, the user searches for or views other broadcast programs using two child pictures.

In accordance with the picture layout information, the control unit 12 determines whether default entry programs are designated for display in the main picture and child pictures 1 and 2 (step S102). When it is ascertained by the control unit 12 that entry programs for the main picture and the child pictures 1 and 2 have already been determined (step S102/YES), the control unit 12 loads, into the RAM 14, information referring to the entry program for the main picture (step S104) and the entry programs for the child pictures 1 and 2 (step S105).

When it is ascertained by the control unit 12 that the entry programs for the main picture and the child pictures 1 and 2 have not yet been determined (step S102/NO), the control unit 12 employs a filtering process to extract entry programs for these pictures and loads them into the RAM 14 (step S103). The process performed at step S103 will be described in detail later.

The procedures performed at steps S104 and S105 to load the entry programs into the RAM 14 will now be described in detail while referring to FIG. 6. In the example in FIG. 6, the number of entry programs for the main screen is one (program #0), and the number of entry programs for each of the child pictures 1 and 2 is five (child picture 1: program #1, program #2, program #3, program #4 and program #5, and child picture 2: program #6, program #7, program #8, program #9 and program #10).

For multi-channel digital broadcasting, it is preferable that, as in this embodiment, the entry program choices for a child picture be narrowed down so as to reduce load imposed on a user during the channel tuning.

Figure 6:
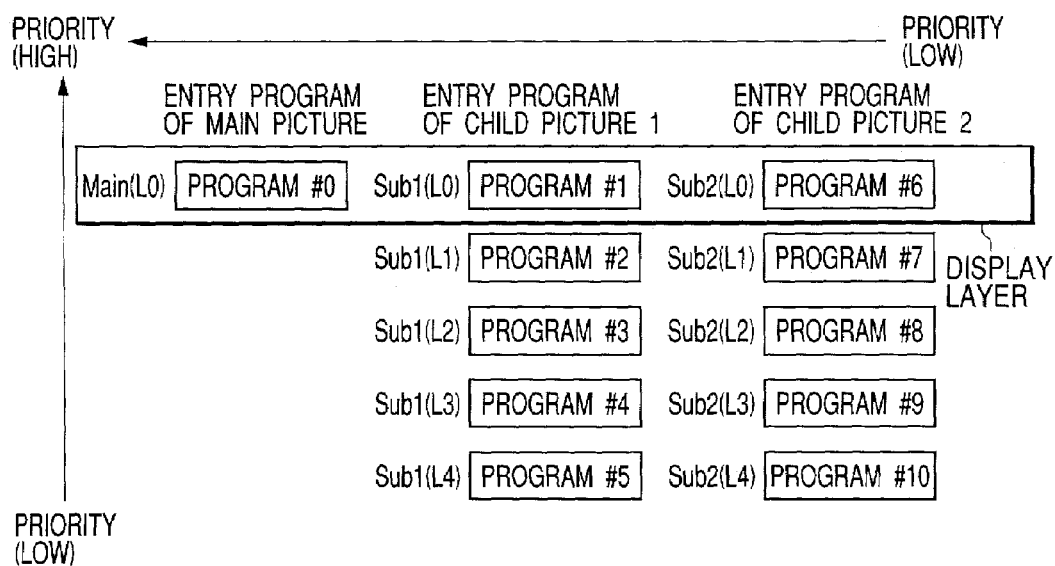
FIG. 6 is a diagram showing an image representing a program entry method for each screen according to the first embodiment of the present invention.

As is indicated by the horizontal axis in FIG. 6, the priority levels of the entry programs are set so that the entry program for the main picture (main picture entry program)

>the entry program for the child picture 1 (child picture 1 entry program)>the entry program for the child picture 2 (child picture 2 entry program).

Further, the vertical axis in FIG. 6 shows the priority levels of the entry programs for child pictures 1 and 2. And the priority levels of the entry programs for the child picture 1 are: program #1 (Sub1(L0))>program #2 (Sub1(L1))>program #3 (Sub1(L2))>program #4 (Sub1(L3))>program #5 (Sub1(L4)); while the priority levels of the entry programs for the child picture 2 are: program #6 (Sub2(L0))>program #7 (Sub2(L1))>program #8 (Sub2(L2))>program #9 (Sub2(L3))>program #10 (Sub2(L4)).

Furthermore, program #0 (Main(L0)), program #1 (Sub1(L0)) and program #6 (Sub2(L0)), which are enclosed by solid lines, form a display layer for the programs that are actually to be displayed on the multi-picture display, and these programs have the highest priority levels as is indicated along the vertical axis, for the individual pictures. The remaining entry programs for the child pictures 1 and 2 are held in the RAM 14 as members of standby queues.

The control unit 12 then controls the tuning performed for the main picture (step S106). Tuning control refers to the following series of control processes. First, the control unit 12 obtains, from the RAM 14, information referring to entry program #0 of Main(L0), and employs this information to control the tuner unit 2-1. This control enables the tuner unit 2-1 to selectively receive a TS that includes program #0.

Next, the control unit 12 controls the demultiplexer 4-1 to separate, from the TS, video data, audio data and additional information for program #0. Finally, the control unit 12 controls the video decoder 5-1 to decode the MPEG2 video data. Thereafter, the control unit 12 controls the tuning for the child pictures 1 and 2 in the same manner (step S107). At this time, the sections 2-2, 3-2, 4-2 and 5-2 are employed as the processing system for the child picture 1, and the sections 2-3, 3-3, 4-3 and 5-3 are employed as the processing system for the child picture 2.

Following this, the control unit 12 sets display parameters for the main picture (step S108). The setup of the display parameters denotes a setup of resolution conversion parameters (an enlargement and reduction rate, a weighting filter coefficient for enlargement and reduction, etc.) for the main picture in the enlargement and reduction unit 6-1, and the setup of memory control parameters (an area for capturing data input to the memory 8-1 and an area for reading data output by the memory 8-1) in the memory control unit 7-1. The resolution conversion parameters and the memory control parameters are calculated by the control unit 12 based on the picture layout information obtained at step S101.

Similarly, the control unit 12 sets the display parameters for the child pictures 1 and 2 (step S109). In this case, the enlargement and reduction unit 6-2 and the memory control unit 7-2 are employed to set the display parameters for the child picture 1, and the enlargement and reduction unit 6-3 and the memory control unit 7-3 are employed to set the display parameters for the child picture 2. When the above processing has been completed, the control unit 12 waits to receive a user action from the remote controller 17 (step S110). As is described above, when a multi-picture shown in FIG. 5 is displayed, as is shown in FIG. 6 the multi-picture display apparatus according to the embodiment determines the priority levels of the entry programs for the pictures and terminates the initialization.

The process at step S103 for filtering the entry programs will now be described in detail while referring to the flowchart in FIG. 4. First, the control unit 12 obtains, from the ROM 13, the maximum number of entry programs for the main picture (step S200), which in this embodiment, as is shown in FIG. 6, is one. Then, the control unit 12 obtains, from the ROM 13, the maximum number of entry programs for the child pictures 1 and 2 (step S201), which in this embodiment, as is shown in FIG. 6, is five each.

The control unit 12 also obtains the current time from the ROM 13 (step S203). As another method that can be used for obtaining the current time, the description of the time stamp included in the TS may be employed, or a date timer may be referred to if one is included in the control unit 12.

The control unit 12 determines whether the entry program to be displayed at the current time has already been set in the RAM 14 (step S204). When the control unit 12 ascertains that the entry program to be displayed at the current time has already been set in the RAM 14 (step S204/YES), the process shifts to the process at step S206.

When at step S204 the control unit 2 ascertains that the entry program to be displayed at the current time has not yet been loaded into the RAM 14 (step S204/NO), the control unit 12 controls the process sections 2-1 to 5-1 to obtain, from the received TS, program information that can be so displayed. For BS digital broadcasting, the program information can be obtained from a whole-net EPG service transmitted with the TS, and for CS digital broadcasting, the program information can be obtained from a promotion channel.

The control unit 12 determines whether the entry program designated at step S204 for display at the current time or the program obtained from the TS at step S205 is a viewing-restricted program (step S206). When the control unit 12 ascertains that the entry program designated at step S204 or the program obtained at step S205 is a viewing-restricted program (step S206/YES), the control unit 12 then determines whether the accounting processing for this program has been completed (step S207).

When the control unit 12 ascertains at step S207 that the accounting processing has been completed (step S207/YES), the process shifts to the process at step S209. And when the control unit ascertains that the accounting processing is incomplete (step S207/NO), the control unit 12 removes, from an entry subject, the entry program designated at step S204 or the program obtained at step S205 (step S208).

For the decision at step S207, the control unit 12 needs information to identify the accounting state of the user, and this information can be obtained from an IC card, for example, on which various information for the limited reception of viewing-restricted programs is recorded.

Next, the control unit 12 determines whether after being narrowed down the number of programs at steps S206 to S208 is greater than the maximum number of entry programs obtained at steps S200 and S201 (in this embodiment, the main picture+the child picture 1+the child picture 2=1+5+5=11) (step S209).

When the control unit 12 ascertains that after being narrowed down the number of programs is still greater than the maximum number of entry programs (step S209/YES), the control unit 12 reads, from the RAM 14, favorite information (the category, the cast, the user's viewing history, etc.) that is set in advance by the user using separate means, and based on this favorite information narrows down the program count so that the number of programs is reduced so as not to exceed the maximum number of entry programs (step S210).

When at step S209 programs have been narrowed down so that the total number of programs does not exceed the maximum number of entry programs (step S209/NO), the control unit 12 performs the prioritizing processing on the entry programs based on the favorite information (step S211).

For example, when the weight of the category of a program is set as a first search condition, and the weight of a performer is set as a second search condition, the higher priorities for the main picture and the child picture 1 can be given in the descending order beginning with the entry program having the greatest weight under the first search condition, and the higher priorities for the child picture 2 can be given in the descending order beginning with the entry program having the greatest weight under the second search condition. As is described above, in this invention, appropriate search conditions based on the favorite information can be set, and one or more search conditions can be established to determine the priority level for the entry program for each picture.

For the main picture, the control unit 12 loads the entry program having the highest priority into the RAM 14 (step S212), and then, for the child pictures 1 and 2, loads the remaining entry programs into the RAM 14 in the order of their priority levels. In this embodiment, the prioritizing processing is performed on the ten entry programs other than the entry program for the main picture, for which the highest priority is allocated.

Specifically, in the prioritizing processing for the child pictures 1 and 2, as is shown in FIG. 6, the entry programs can be set near the display layer in the descending order of their priority levels, and the priority level for the child picture 1 can be set higher than that for the child picture 2. That is, it is preferable that the entry programs be allocated beginning with the entry program having the highest priority level, in the order for program #1 (Sub1(L0))>program #6 (Sub2(L0))>program #2 (Sub1(L1))>program #7 (Sub2(L1))>program #3 (Sub1(L2))>program #8 (sub2(L2))>program #4 (Sub1(L3))>program #9 (Sub2(L3))>program #5 (Sub1(L4))>program #10 (Sub2(L4)).

An explanation will now be given for the tiling development processing of entry programs for child pictures when double tuners are employed. In this processing, when the user operates the remote controller 17 to select either one of the child pictures 1 and 2, and performs the display switching operation for the multi-picture display apparatus that has been initialized, the multi-picture display apparatus accepts this user action, and switches and displays the entry programs in order in accordance with the priority levels in FIG. 6. Then, the user can search for and view broadcast programs.

However, when the priority level of a subject entry program is low, in many cases, the user can not find the entry program immediately and tends to repeat the display switching operation using the remote controller 17 until the desired entry program is reached. Especially for multi-channel digital broadcasting, this trend tends to occur frequently because the number of entry programs is large. Therefore, there is desired a method for displaying a list of all available entry programs with which a user will quickly select a target entry program.

Figure 7:
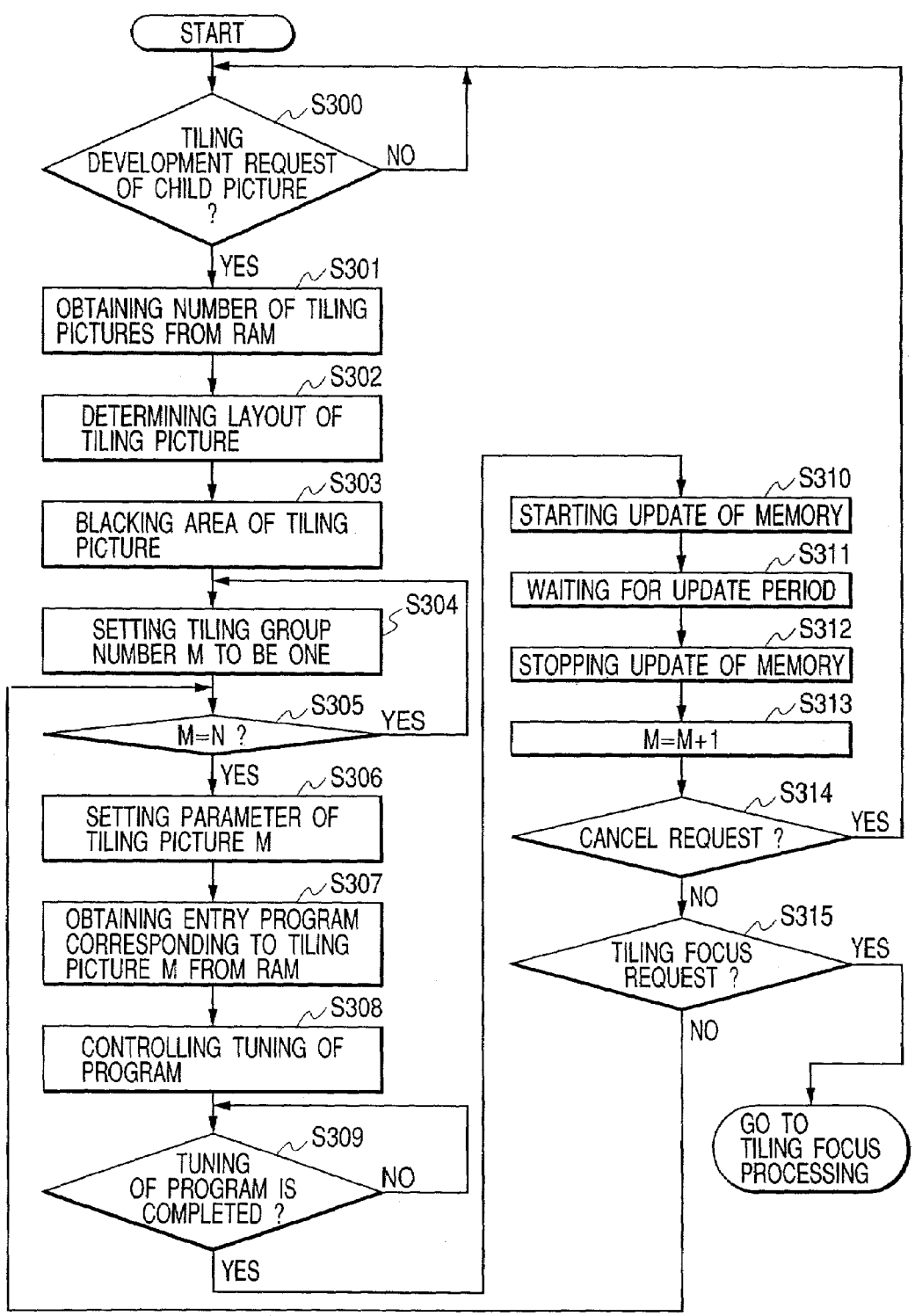
FIG. 7 is a flowchart showing the tiling development display processing according to the first embodiment of the present invention.

In order to clarify that the embodiment can implement the above method, the multi-picture display operation of this embodiment will now be described in detail while referring to FIG. 7 and FIGS. 8A to 8D. FIG. 7 is a flowchart showing the tiling development and display processing during which the list of entry programs that are broadcast can be displayed. FIGS. 8A to 8D are diagrams showing an example image for the display of a tiling development picture.

To easily understand the following explanation, the independent processing system from 2-1 to 8-1 in FIGS. 1A and 1B is defined as the main picture processing system, the independent processing system from 2-2 to 8-2 is defined as the child picture 1 processing system, the independent processing system from 2-3 to 8-3 is defined as the child picture 2 processing system, and the independent processing system from 2-4 to 8-4 is defined as the processing system used in common for the child pictures 1 and 2. The synthesization unit 9 is capable of handling all four of these independent processing systems at the same time.

In the display state prior to tiling development in FIG. 8A, the user can select either one of the child pictures 1 and 2 by using the remote controller 17, and can request the tiling development window be displayed for the selected child picture.

The control unit 12 determines whether the tiling development display request from the user has been accepted in the display state prior to tiling development shown in FIG. 8A (step S300). When the control unit 12 ascertains that the tiling development display request from the user has been accepted (step S300/YES), the control unit 12 obtains N tiling pictures from the RAM 14 (step S301).

The N tiling pictures are equivalent in number to the entry programs that belong to the non-display layer for the child pictures 1 and 2. In this embodiment, since as is shown in FIG. 6 four programs, program #2 (Sub1(L1)) to program #5 (Sub1(L4)), are entered in the non-display layer for the child picture 1, the tiling picture number N is four.

Figure 9A:
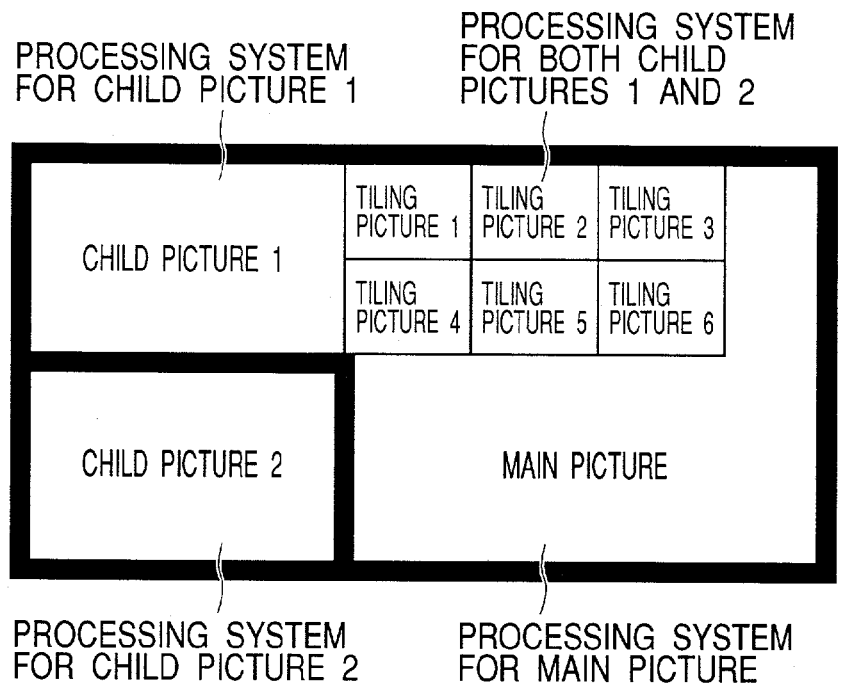
FIGS. 9A and 9B are diagrams showing the layout of a tiling development picture according to a second embodiment of the present invention.

The control unit 12 then determines the layout for the tiling development picture (step S302). In this embodiment, assume it is determined that, as is shown in FIG. 9A, the layout for the tiling development picture will include six segments. The tiling development picture is then generated by the enlargement reduction unit 6-4 and the memory control unit 7-4 under the control of the control unit 12. The processing for generating the tiling development picture will now be described in detail.

First, the control unit 12 controls the memory control unit 7-1 to write blackout data into the address area of the memory 8-4 that corresponds to the tiling development picture area. Then, when this blackout data is read from the memory 8-4, as is shown in FIG. 8B, the tiling development picture area is blacked out on the screen (FIG. 8A) for the multi-picture display (step S303).

This processing is performed because when the number of tiling pictures required to display the entry programs in the non-display layer is smaller than the maximum number of segments allocated for the tiling development picture, unestablished data in the remaining picture segment areas must be prevented from being displayed. In this embodiment, since the maximum number of picture segments is six and the number of entry programs in the non-display layer is four, the remaining two tiling pictures are blacked out. Of course, the data for blacking out the tiling development picture is not limited to blackout data.

Then, the control unit 12 initializes to one, the tiling group number M used to represent the position of each tiling picture (step S304), and shifts the process into the tiling display loop beginning at step S305. In the tiling display loop, first, the control unit 12 sets a tiling picture parameter to display an entry program in a tiling picture 1 that corresponds to tiling group number 1 (step S306).

Specifically, the control unit 12 writes a layout coordinate parameter into the memory control unit 7-4 to set up a memory area that corresponds to the tiling picture 1, and writes a resolution conversion parameter into the enlargement and reduction unit 6-4 to reduce the size of the entry program to that of the tiling picture 1.

Then, the control unit 12 obtains, from the RAM 14, information referring to the entry program of the priority level that corresponds to the tiling picture 1 (step S307). In this embodiment, as is shown in FIG. 6, program #2 (Sub1 (L1)) corresponds to this program. The control unit 12 then performs channel tuning to select program #2 (step S308). That is, the control unit 12 controls the tuner unit 2-4 to tune in to the TS that includes program #2, controls the demodulation unit 3-4 to demodulate the TS, and controls the multiplexer 4-4 to separate from the TS the video data, the audio data and the additional information for program #2.

When the video decoder 5-4 decodes the thus obtained video data, the program tuning operation is then completed. The control unit 12 waits to execute the next control process until the program tuning series is completed (step S309).

When the control unit 12 ascertains that the program tuning series has been completed (step S309/YES), the control unit 12 controls the enlargement and reduction unit 6-4 and the memory control unit 7-4 to begin to update the memory 8-4 for program #2 (step S310). At this time, the memory control unit 7-4 performs the updating process based on the tiling picture parameter that is set by the control unit 12. As a result, the moving images for program #2 are displayed in the tiling picture 1, as is shown in FIG. 8C. The moving image display time period corresponds to the period for the updating at step S311 of program #2 in the memory 8-4.

Next, the control unit 12 controls the memory control unit 7-4 to halt the updating of the memory 8-4 for program #2 in order to shift to the display control for the next tiling picture (tiling picture 2 in FIGS. 8A to 8D) (step S312). Thus, the tiling picture 1 in FIG. 8C is displayed as a captured still image. Following this, the control unit 12 increments the tiling group number M by one (step S313), and thereafter, repeats the process beginning at step S305.

Since the control unit 12 repeats the process at steps S305 to 313 while reading, from the RAM 14, information referring to the entry program for the priority level that corresponds to each tiling picture, the control unit assigns program #3 (Sub1(L2)) to tiling picture 2, assigns program #4 (Sub1(L3)) to tiling picture 3, and assigns program #5 (Sub1(L4)) to tiling picture 4. When the control unit 12 has assigned the entry programs up to and including the tiling picture 4, it returns to the process performed for tiling picture 1 and sequentially displays the moving images for the tiling pictures 1 to 4.

Furthermore, following the process at step S313, the control unit 12 accepts a cancel request and a tiling focus request from the user (the tiling focus request will be described in detail later during the explanation for a third embodiment) (steps S314 and S315). So long as the control unit 12 does not receive the cancel request or the tiling focus request from the user, the control unit 12 repetitively continues to perform the process at steps S305 to S313.

The tiling development display for the child picture 1 has been explained, and the same processing can be performed for the tiling development display for the child picture 2. Since these processing steps are performed, the list of the entry programs belonging to the non-display layer of the child picture can be displayed, and program tuning can be performed whereby the user can quickly select a desired program.

In addition, in this embodiment, the entry programs belonging to the display layer of the child picture are constantly displayed in the child picture as fixed, and only the entry programs belonging to the non-display layer are displayed in the tiling development picture. By using this display method, even when the tiling development picture is displayed, an entry program belonging to the display layer can be distinguished from an entry program belonging to the non-display layer, and the user can easily identify the priority level of each entry program. This is an effect inherent to this embodiment.

A second embodiment of the present invention will now be described. But first, an explanation will be given for the tiling development operation for entry programs for child pictures when a single tuner is employed.

In the first embodiment, the independent processing system from 2-4 to 8-4 in FIGS. 1A and 1B, which is used in common for the child pictures 1 and 2, is assigned for the tiling development display of the child pictures 1 and 2, the independent child picture 1 processing system from 2-2 to 8-2 in FIGS. 1A and 1B is assigned for the tiling development display of the child picture 1, and the independent child picture 2 processing system from 2-3 to 8-3 in FIGS. 1A and 1B is assigned for the tiling development display of the child picture 2. Thus, the entry programs belonging to the display layer of the child pictures 1 and 2 are displayed as fixed in the child pictures 1 and 2, instead of being displayed in the individual tiling pictures. Therefore, as a new possible usage, while the entry programs having the highest priority levels for the child pictures 1 and 2 are displayed as moving images in the child pictures 1 and 2, the entry programs of lower priority levels are displayed as secondary moving images in the tiling development picture.

However, a case may be encountered wherein the independent processing system from 2-4 to 8-4, which is used in common for the child pictures 1 and 2, can not be provided because of a system cost reduction or a project for another product. The second embodiment for coping with such a case will now be described, while focusing mainly on the differences between the second and the first embodiment.

Figure 9B:
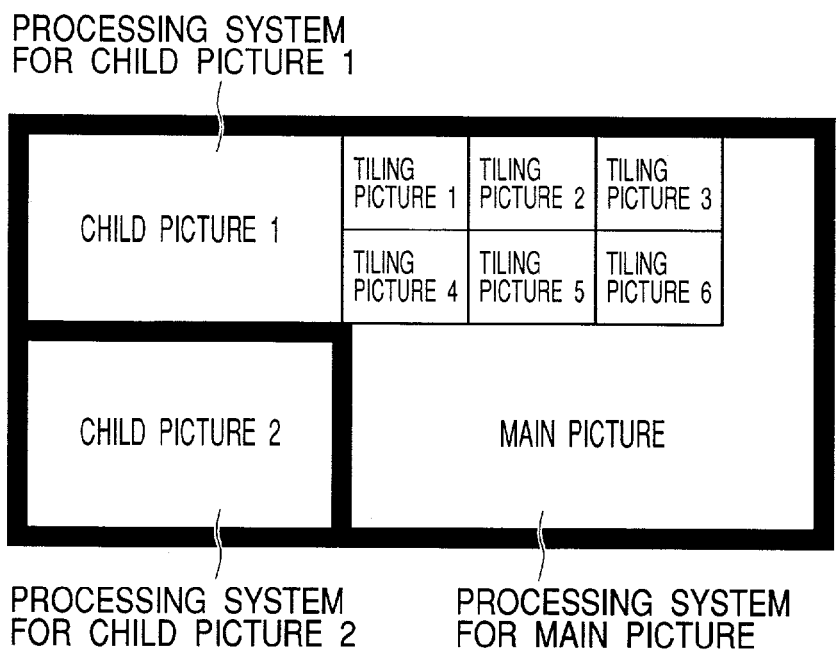

An image for a tiling development picture according to the embodiment is as shown in FIG. 9B. In this case, the processing system 2-1 to 8-1 in FIGS. 1A and 1B for the main picture is assigned to the main picture, the child picture 1 processing system from 2-2 to 8-2 is assigned to the child picture 1 and the tiling development picture thereof, and the child picture 2 processing system 2-3 to 8-3 is assigned to the child picture 2.

In this embodiment, when the control unit 12 accepts a request from a user to display a tiling development picture, before performing the tuning to program #2, the control unit 12 controls the memory control unit 7-2 to halt the updating process for program #0. Then, the moving image displayed in the child picture 1 for program #0 is displayed as a still image that has been captured.

Further, the control unit 12 controls the processing system 2-2 to 5-2 to perform the tuning for program #2. And when the program tuning is completed, the processing system 6-2 to 7-2 initiates the updating of the memory 8-2 for program #2. Thereafter, by repeating the processing shown in FIG. 7, as in the first embodiment, the entry programs belonging to the non-display layer can be displayed as secondary moving images in the tiling development picture.

Even when, unlike in the first embodiment, the independent processing system for the tiling development picture can not be provided, the list of entry programs belonging to the non-display layer can be displayed as secondary moving images, while the entry program for the child picture is displayed as a static image. In the above description, the child picture 1 has been employed; however, when the same process is performed on the child picture 2, the tiling development display can be obtained without the processing system, which is used in common for the child pictures 1 and 2, being required.

Figure 10:
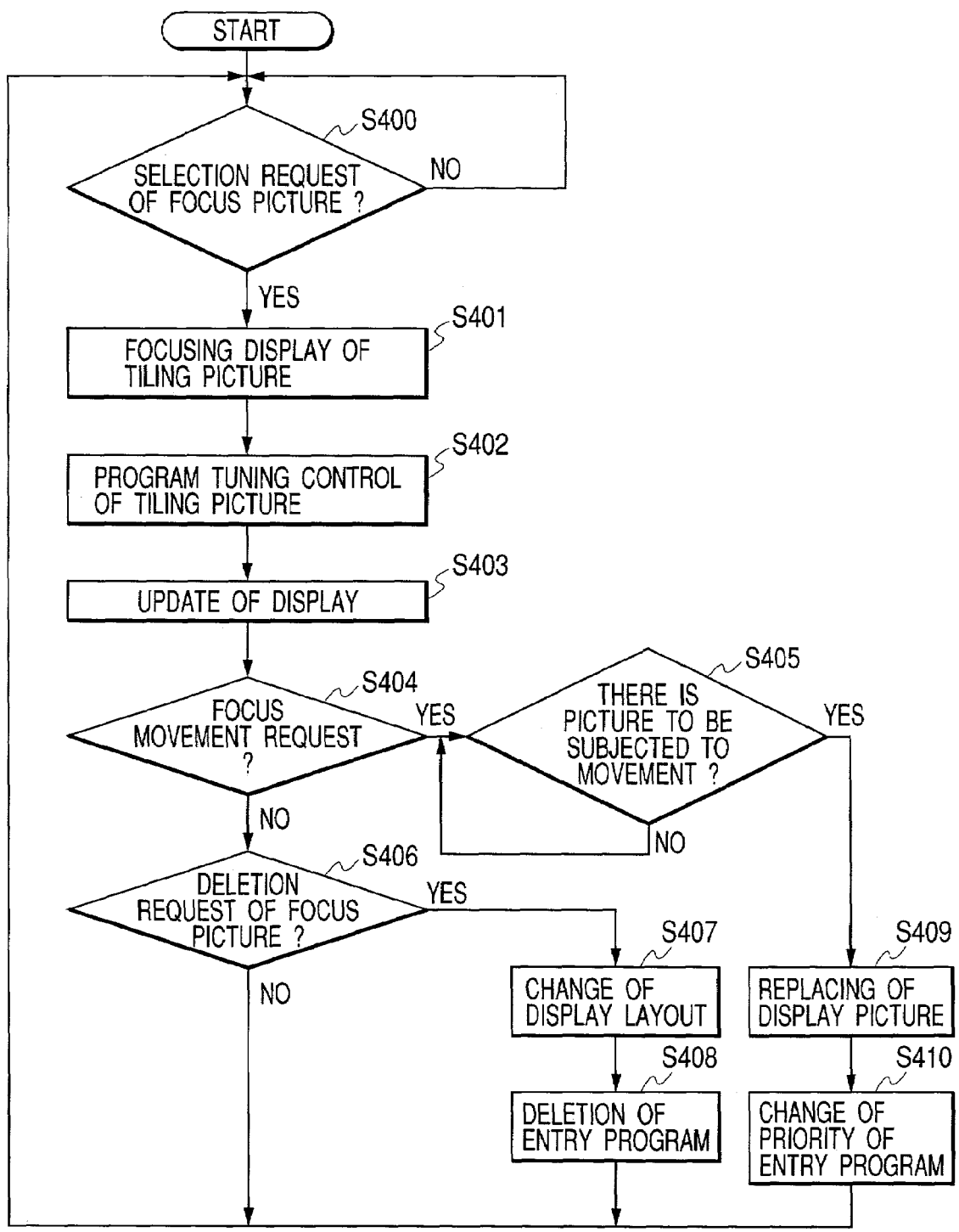
FIG. 10 is a flowchart showing the tiling focusing processing according to a third embodiment of the present invention.

A third embodiment of the present invention will now be described while referring to FIG. 10 and FIGS. 11A to 11D. FIG. 10 is a flowchart showing the tiling focusing processing, and FIGS. 11A to 11D are diagrams showing images for the display of pictures during the tiling focusing processing.

According to this embodiment, a user can either select in the tiling development picture a tiling picture in which a moving image for an entry program is to be constantly displayed, or can either display in another picture the entry program for a selected tiling picture or delete from the tiling development picture the entry program for a selected tiling picture. In the following explanation, a selected tiling picture is called a tiling focus picture, and a request for the constant display in the tiling focus picture of the moving image for the entry program is called a tiling focus request.

When a tiling focus request is issued at step S315 in FIG. 7, the control unit 12 determines whether the tiling focus request includes a request for the selection of a tiling focus picture (step S400). When the control unit 12 ascertains that a tiling focus picture is included in the selection request (step S400/YES), the control unit 12 controls the GUI generation unit 15 to draw a focus frame in the tiling focus picture (step S401). The user can move this focus frame by operating the remote controller 17, and can select an arbitrary tiling picture as a tiling focus picture.

The control unit 12 then employs the processing system 2-4 to 5-4 to perform program tuning of the entry program in the tiling focus picture (step S402). Then, once the program tuning has been completed, the control unit 12 employs the processing system 6-4 to 7-4 to update the memory 8-4 for the relevant entry program. Further, during the updating period, the control unit 12 halts the updating of the other entry programs in the memory 8-4.

Figure 11A:
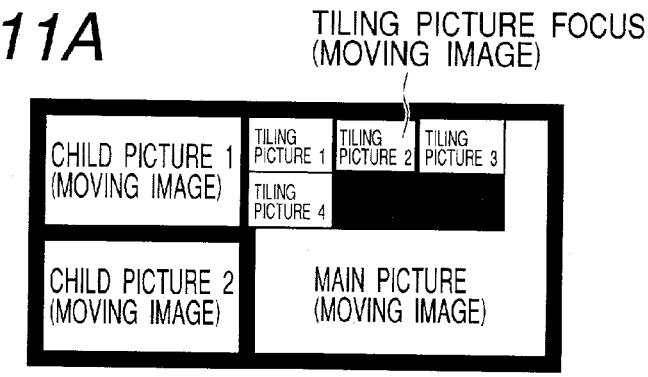
FIGS. 11A, 11B, 11C and 11D are diagrams showing an image representing the tiling development picture display method according to the third embodiment of the present invention.

Therefore, when as a result of a user action a tiling focus request is issued, the display in the tiling development picture of additional secondary moving images is halted, and the only moving image for the entry program is displayed, while for other entry programs, still images are captured and displayed in the remaining tiling pictures. Then, following the completion of the above processing steps, the displayed pictures are updated (step S403). The image of the picture displayed at this time is shown in FIG. 11A.

In the above explanation, the processing performed in the first embodiment is employed. However, the above operation can also be applied to the second embodiment. Specifically, when a tiling focus request is issued, the only moving image displayed is the one for an entry program in a tiling focus picture, while a still image in displayed in the child picture 2 and still images for other entry programs are captured and displayed in the remaining tiling pictures.

In addition, while the control unit 12 displays the moving image for the entry program in the tiling focus picture, it determines whether a focus movement request from the user has been received (step S404). A focus movement request is one issued by a user who employs the remote controller 17 to move an entry program displayed in a tiling focus picture to another tiling picture.

When a focus movement request has been received (step S404/YES), the control unit 12 determines whether the picture at the movement destination is an effective picture (step S405). According to the example in FIGS. 8A to 8D, effective pictures are the main picture, the child pictures 1 and 2 and the tiling pictures 1 to 4, and ineffective pictures are blacked out, ineffective data areas.

When the control unit 12 ascertains at step S405 that the picture at the movement destination designated in the focus movement request is an effective picture (step S405/YES), the control unit 12 exchanges the contents of the display pictures (step S409). That is, the control unit 12 displays in the picture at the movement destination the entry program that initially was displayed in the tiling focus picture, and displays in the original tiling focus picture the entry program that initially was displayed in the picture at the movement destination.

Figure 11B:
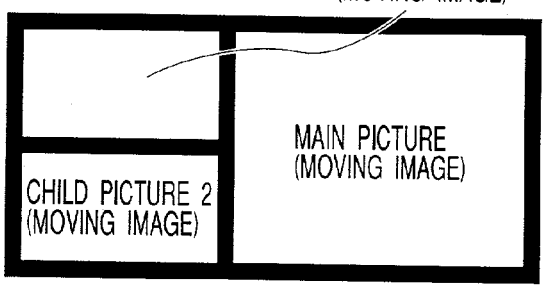

The exchange of the display pictures will now be described by referring to specific examples. A first example is shown in FIG. 11B. Specifically, the entry program displayed in the tiling focus picture (tiling picture 2) is displayed in the child picture 1, and the entry program displayed in the child picture 1 is displayed in the tiling picture 2 that is originally the selected tiling focus picture.

This function is effective when, before or after the tiling development is performed, the user desires to display in a child picture, wherein, as in the main picture, a moving image can be displayed, the entry program that currently is displayed in the tiling focus picture. Further, through this action, the priority levels in FIG. 6 for the entry programs for the child picture 1 are changed as follows (step S410).

Main(L0)←program #0
Sub1(L0)←program #3
Sub1(L1)←program #1
Sub1(L2)←program #2
Sub1(L3)←program #4
Sub1(L4)←program #5

In this manner, the control unit 12 changes the order of the priorities of the entry programs, and rewrites the data in the RAM 14.

Figure 11C:
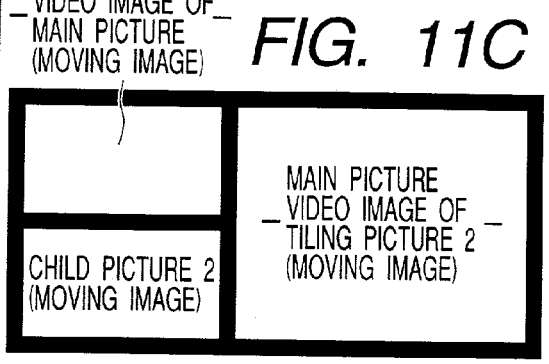

A second example is as shown in FIG. 11C. Specifically, the entry program initially displayed in the tiling focus picture is now displayed in the main picture, while the entry program initially displayed in the main picture is now displayed in the tiling picture 2, which originally was selected as the tiling focus picture.

This function is effective when a user desires to view in a main picture an entry program that currently is displayed in a tiling focus picture. Further, through this action, the priority levels in FIG. 6 of the entry programs related to the main picture are changed as follows (step S410).

Main(L0)←program #3
Sub1(L0)←program #0
Sub1(L1)←program #1
Sub1(L2)←program #2
Sub1(L3)←program #4
Sub1(L4)←program #5

In this manner, the, control unit 12 changes the priority levels of the entry programs and rewrites the data in the RAM 14.

The operation of the control unit 12 for each of the above examples will now be described in detail. In the first example, upon receiving the request for the exchange of the display pictures, submitted as the result of a user action, the control unit 12 reads, from the RAM 14, information referring to program #3, which is the entry program for the tiling picture 2, and information referring to program #1, which is the entry program for the child picture 1. Then, the control unit 12 controls the memory control units 7-2 and 7-4 to halt the updating of the memories 8-2 and 8-4.

At the same time as the updating is halted, the control unit 12 employs the processing system 2-2 to 2-5 to perform program tuning of program #3, and employs the processing system 2-4 to 5-4 to perform program tuning of program #1. When the program tuning of program #3 is completed, the control unit 12 employs the processing system 6-2 to 7-2 to initiate updating of program #3 in the memory 8-2. And when the program tuning of program #1 is completed, the control unit 12 employs the processing system 6-4 to 7-4 to initiate updating of program #1 in the memory 8-4. In this manner, the exchange of the display pictures, as explained in the first example, is effected. Further, when this process is applied to the second embodiment, the control unit 12 controls the memory control unit 7-3 to switch the memory areas of program #3 and program #0 in the memory 8-3. As a result, the exchange of the display pictures can be implemented.

The process for halting the updating of the memory 8-2 or 8-4 need not always be performed after information referring to program #3 or information referring to program #1 is read from the RAM 14. When the process for halting the updating of program #3 in the memory 8-2 or the updating of program #1 in the memory 8-4 is performed immediately after the updating is initiated, the display pictures can be smoothly exchanged, and satisfactory program viewing can be provided.

The above second example will now be described. Upon receiving a request for the exchange of display pictures, submitted as a result of a user action, the control unit 12 reads from the RAM 14 information referring to program #3, which is the entry program for the tiling picture 2, and information referring to program #0, which is the entry program for the main picture. Then, the control unit 12 controls the processing systems 6-1 to 7-1 and 6-4 to 7-4 to halt the updating of the memories 8-1 and 8-4.

Furthermore, at the same time as the updating is halted, the control unit 12 employs the processing system 2-1 to 5-1 to perform program tuning of program #3, and employs the processing systems 2-4 to 5-4 to perform program tuning of program #0. When the program tuning of program #3 is completed, the control unit 12 employs the processing system 6-1 to 7-1 to initiate the updating of program #3 in the memory 8-1. Similarly, when the program tuning for program #0 is completed, the control unit 12 employs the processing system 6-4 to 7-4 to initiate the updating of program #0 in the memory 8-4. As a result, the exchange of the display pictures, as in the second example, is implemented. Further, when this process is applied to the second embodiment, to effect the exchange of display pictures, the processing system 6-4 to 7-4, which is used in this explanation, need merely be replaced by the processing system 6-3 to 7-3.

Also, as in the first example, when the updating of program #3 in the memory 8-1 or the updating of program #0 in the memory 8-4 is initiated, the process for halting the updating may be performed.

Further, when the control unit 12 ascertains at step S404 that the focus movement request is not received (step S404/NO), the control unit 12 determines whether it receives a request for the deletion of program #3, which is the entry program for the current tiling focus picture, i.e., the tiling picture 2 (step 406).

And when the control unit ascertains that the deletion request is received (step S406/YES), the control unit 12 deletes program #3 from the display picture. This function is effective when a user desires to reduce the number of tiling pictures in the tiling development picture, or when a program that is not a favorite of the user is displayed in the tiling picture.

Furthermore, when the control unit 12 ascertains at step S406 that as a result of a user action the deletion request is accepted, the control unit 12 changes the layout of the tiling development picture (step S407) and deletes program #3 from the tiling picture 2 (step S408).

Figure 11D:
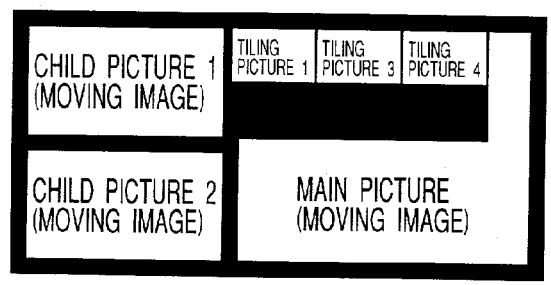

As a result, as is shown in FIG. 11D, programs #4 and #5 are shifted to tiling pictures 2 and 3 and are displayed therein. Through this action, the priority levels in FIG. 6 are changed for the child picture 1 (step S407).

Main(L0)←program #0
Sub1(L0)←program #1
Sub1(L1)←program #2
Sub1(L2)←program #4
Sub1(L3)←program #5

In this manner, the control unit 12 changes the priority levels of the entry programs, and rewrites the data in the RAM 14.

Thereafter, when the control unit 12 accepts a deletion request initiated by a user action, the control unit 12 controls the memory control unit 7-4 to exchange the memory area of program #4 for the area corresponding to the tiling picture 2, and to exchange the memory area of program #5 for the area corresponding to the tiling picture 3. At this time, the remaining tiling picture 4 is colored using blackout data; and therefore, after program #3 has been deleted, the obtained display picture is as shown in FIG. 11D.

In the preceding explanation, this embodiment, as well as the first embodiment, has been applied to an apparatus that includes the processing system used in common for the child pictures 1 and 2. However, this embodiment is not thereby limited, and can also be applied to the system in the second embodiment. In this case, the control unit 12 controls the memory control unit 7-4 to shift and display the layout of the tiling development picture. Furthermore, the embodiment which will be described below is based on the assumption that the operation in the first embodiment will be used. However, by performing in the same manner the operation explained in the second embodiment, the embodiment described below can also be applied to a configuration that does not include the processing system used in common for the child pictures 1 and 2.

Figure 12A:
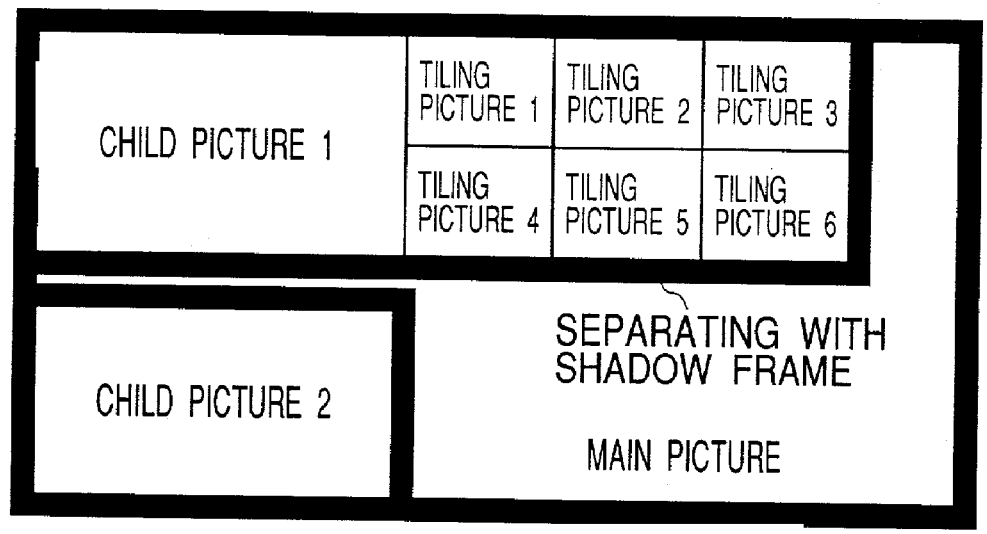
FIGS. 12A and 12B are diagrams showing an image representing a method for displaying a tiling development picture according to a fourth embodiment of the present invention.
Figure 12B:
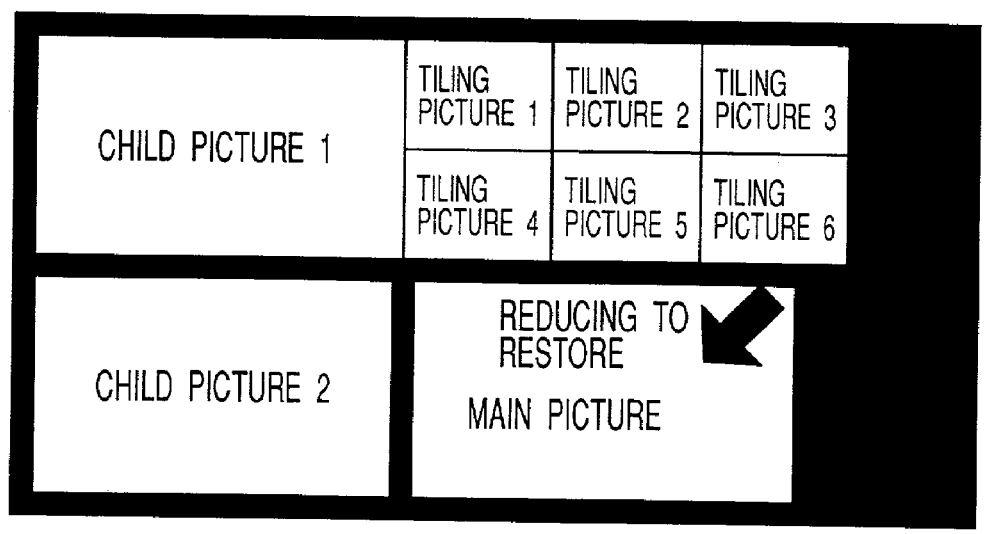

A fourth embodiment of the present invention will now be described. There is a case wherein it is difficult for a tiling development picture that is displayed to be distinguished from another picture, such as a main picture. The configuration in this embodiment copes with this problem. FIGS. 12A and 12B are diagrams showing display picture images when tiling picture development is performed in this embodiment. The embodiment will now be described in detail while referring to FIGS. 12A and 12B.

In the example in FIG. 12A, to display the tiling development picture, the control unit 12 controls the GUI generation unit 15 to draw shadow frames along the peripheral edges of the child picture 1 and the tiling development picture, so as to clearly define the boundaries between the child picture 1 and the tiling development picture, and the main picture.

This means is especially effective when the display condition (the brightness, the contrast, the display color, etc.) of the tiling development picture is the same as that of the main picture. As another method, a shadow frame may be drawn only around the tiling development picture.

In the example in FIG. 12B, in order to display the tiling development picture, the control unit 12 controls the memory control unit 7-1 to reduce the size of the memory area that is allocated for the main picture, so that overall the main picture is reduced and restored so that it does not overlap the tiling development picture. The process employed for the reduction and restoration of the main picture can be performed at the same time as the tiling development picture is displayed. Further, in order to make it easy for a user to identify that the main picture restored from the tiling development picture, another method is effective whereby the main picture is reduced and is restored after a predetermined period of time has elapsed following the overlaying of the main picture by the tiling development picture.

A fifth embodiment of the present invention will now be described. In the first to the fourth embodiments, the number N for the tiling picture counts was smaller than the maximum number of segments in the tiling development pictures. But when the number N for a tiling picture count exceeds the maximum number of segments in a tiling development picture, the display of the tiling development picture may have to be enlarged, or the sizes of the tiling pictures that are displayed may have to be reduced. However, from the viewpoint that the most important factor is providing acceptable program viewing, it is preferable that the ratios of tiling development pictures to main pictures be reduced, and that the resolutions of the tiling pictures that are displayed be maintained, so that there is no deterioration of visibility.

Figure 13A:
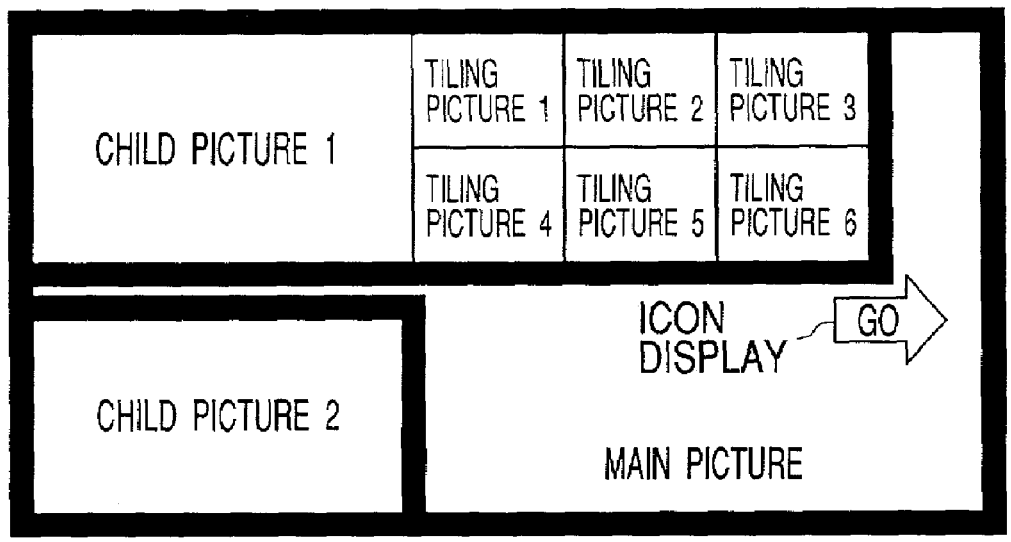
FIGS. 13A and 13B are diagrams showing an image representing the tiling development picture display method according to a fifth embodiment of the present invention employed when the number of child picture entries is greater than the maximum number of segments in a tiling development picture.
Figure 13B:
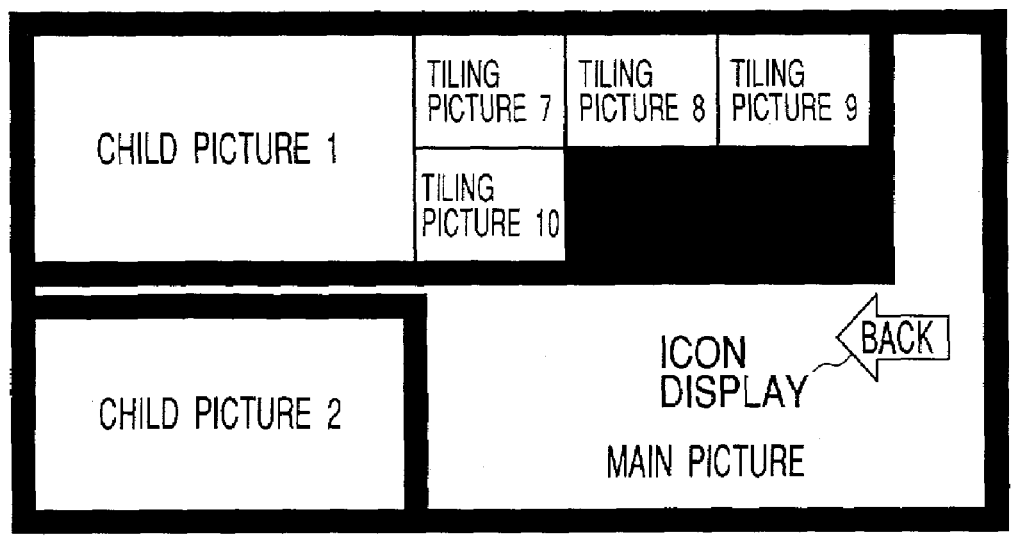

The configuration of this embodiment is provided to cope with this problem, and FIGS. 13A and 13B are diagrams showing display picture images when tiling picture development is performed. The fifth embodiment will now be described in detail while referring to FIGS. 13A and 13B.

In this embodiment, assume that the maximum number of segments in a tiling development picture is ten, and that the number of tiling pictures to be displayed is also ten. In FIG. 13A, tiling pictures 1 to 6 are displayed in a tiling development picture, and an icon "go" is displayed outside the tiling development picture in order to notify a user that there are tiling pictures that are not displayed on the screen.

To refer to the tiling pictures that are not displayed, the user need only select the icon "go". Then, when the additional tiling development pictures in FIG. 13B are displayed, the user can view the tiling pictures 7 to 10 in the tiling development picture.

To return to the tiling development picture in FIG. 13A, the user need only select the icon "back" in FIG. 13B, which is also displayed outside the tiling development picture.

In this embodiment, all the tiling pictures can be viewed by a single operation of an icon. Thus, when there are more tiling pictures than are displayed at one time, the user need only repeat the operation with the icon to switch between the tiling development pictures.

In this embodiment, when the control unit 12 determines that the number of entry programs in the non-display layer is greater than the maximum number of segments in the tiling development picture, it controls the GUI generation unit 15 to generate the icon described above. Further, when as the result of an act by a user the icon is selected, the control unit 12 performs the program tuning and memory updating explained in the flowchart in FIG. 7, and writes the remaining entry program images in the memory areas that correspond to the tiling pictures of the next tiling development picture. As a result, as is shown in FIG. 13B, the next tiling development picture is displayed. The same operation can be applied to the second embodiment.

Therefore, even when the number N for the tiling pictures is greater than the maximum number of segments in the tiling development picture, all the tiling pictures can be displayed, without altering either the overlay ratio of the tiling development picture to the main picture, or the display resolutions of the tiling pictures.

A sixth embodiment of the present invention will now be described.

In this embodiment, the probability is taken into account that a user, while viewing an image in a main picture, will experience an oppressive sensation produced by the presence on a display of a tiling development picture. In order to clarify the above described feature, this embodiment will now be described in detail while referring to FIG. 14

The control unit 12 determines whether a tiling development display request from a user is accepted in the display state in FIG. 8A before tiling development is performed (step S500). When the control unit 12 ascertains that the tiling development display request from the user is accepted (step S500/YES), the control unit 12 obtains from the RAM 14 the number N of tiling pictures (step S501).

Figure 14:
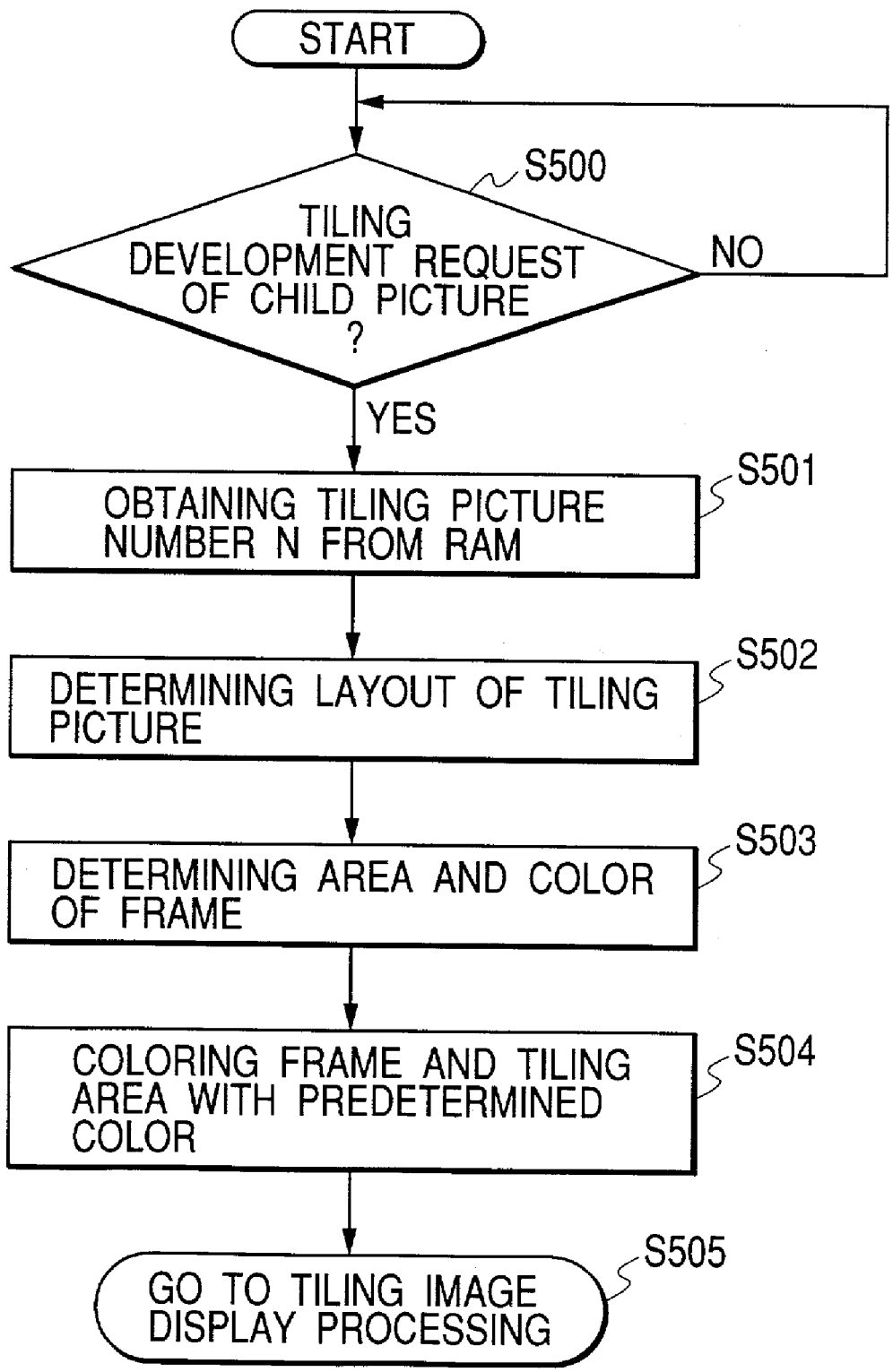
FIG. 14 is a flowchart showing the tiling development processing according to a sixth embodiment of the present invention.

The number N of tiling pictures equals the number of entry programs belonging to the non-display layers for the child pictures 1 and 2. In this embodiment, as is shown in FIG. 14, since four programs, program #2 (Sub1(L1)) to program #5 (Sub1(L4)), are entered in the non-display layer for the child picture 1, the number N of the tiling pictures is four.

Then, the control unit 12 determines the layout of the tiling development picture (step S502). In this embodiment, assume that it is determined that a tiling development picture has six segments, as is shown in FIG. 9A. It should be noted that the tiling development picture is generated by the enlargement and reduction unit 6-4 and the memory control unit 7-4 under the control of the control unit 12. The processing performed to generate the tiling development picture for this embodiment will now be described in detail.

At this time, the control unit 12 determines the frame area that encloses the child picture 1 from which the tiling development display is requested, the frame area (tiling frame area) that encloses the tiling development picture, and the colors of these frames (step S503). The areas and colors of the frames may be either set in advance for the control unit 12, or may be generated by the GUI generation unit 15 under the control of the control unit 12.

Since the method for generating the tiling development picture is the same as that for the first embodiment, no further explanation for it will be given. It should be noted that, as the feature of the embodiment, the display area for the tiling development picture indicated by the picture layout information always designates the lower portion of the display picture.

Next, the control unit 12 employs the memory control units 7-2 and 7-4 to write the frame color data into the external frame area of the child picture 1 and the display area for the tiling development picture, so that the frame area of the child picture 1 and the display area for the tiling development picture are blacked out. This process is performed because when the number of entry programs belonging to the non-display layer is smaller than the number of tiling pictures in the tiling development picture, non-established data is prevented from being displayed in the remaining tiling picture area.

Figure 15A:
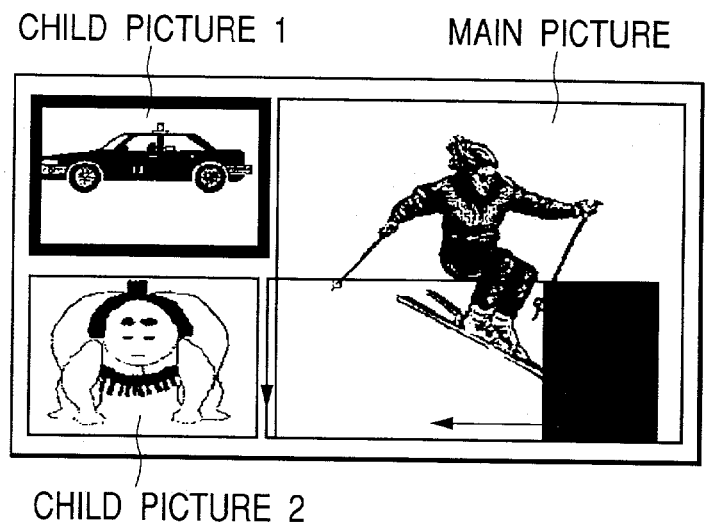
FIGS. 15A, 15B and 15C are diagrams showing an image representing the tiling development processing according to the sixth embodiment of the present invention.
Figure 15B:
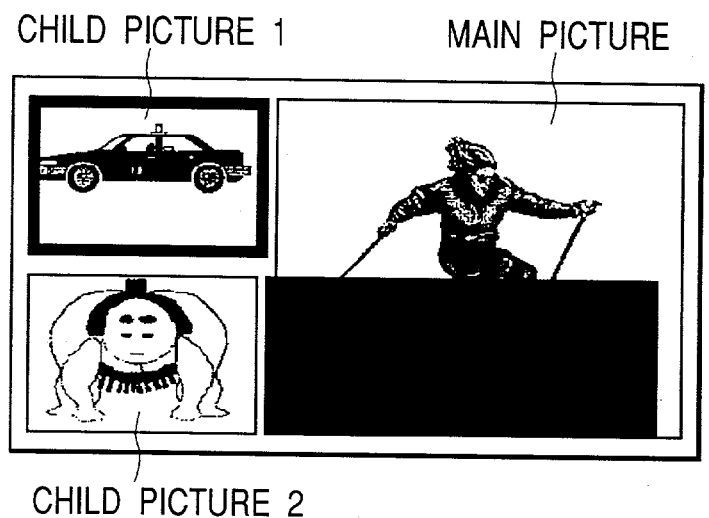

FIG. 15A is a diagram showing an image for the picture displayed when the frame area of the child picture 1 and the display area of the tiling development picture are being blacked out with the frame color data. As is shown in FIG. 15A, the frame area of the child picture 1 is blacked out and the right side of the frame is extended in the direction indicated by a downward pointing arrow. As for the display area of the tiling development picture, the portion enclosed by a broken line is blacked out continuously from the right in the direction indicated by a leftward pointing arrow. The display state wherein the black out process is completed is shown in FIG. 15B. Finally, as is shown in FIG. 15C, tiling pictures are displayed in the tiling development picture.

Figure 15C:
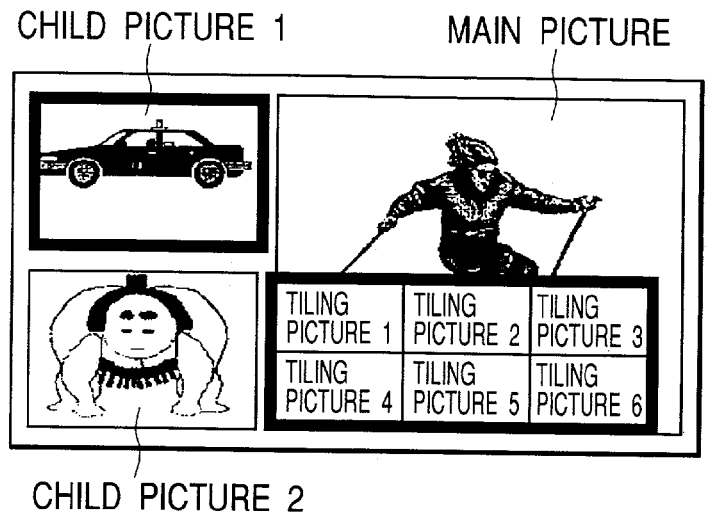

Therefore, as is shown in FIG. 15C, since an external frame having the same color as is used for the blacking out is displayed along the peripheral edges of the tiling development picture and the child picture 1, and the external frames of the tiling development picture and the child picture 1 are connected by lines of the same color, it is easy to visually confirm that the entry program of the non-display layer for the child picture 1 is displayed in the tiling development picture.

Figure 16:
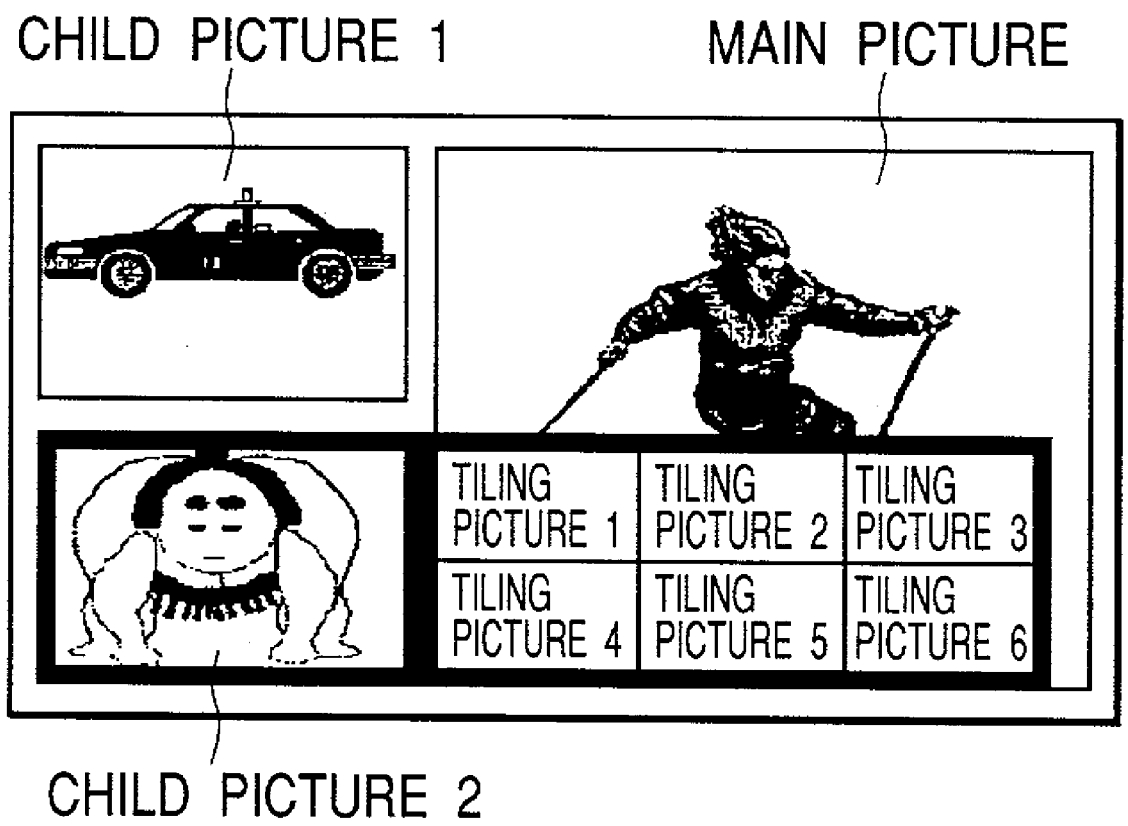
FIG. 16 is a diagram showing an image for the tiling development picture according to the sixth embodiment of the present invention.

Similarly, when a tiling development display is requested for the child picture 2, since the child picture 2 is located in the lower portion of the screen, as is shown in FIG. 16, the tiling development picture is displayed adjacently to the child picture 2. Thus, it is easy to visually confirm that the entry program of the non-display layer for the child picture 2 is displayed in the tiling development picture.

As is described above, since the location of the display area for the tiling development picture to be displayed is always limited to the lower portion of the main picture, the tiling development picture can be displayed without being overlapped by the upper portion of the main picture, so that the tiling development display shown in FIG. 15C or FIG. 16 can be obtained.

Therefore, neither will the head or face of a person that is drawn on a screen be hidden, nor will interruption of the spatial expanse of a scenery image and an oppressive sensation be, which are caused by that the upper portion of a displayed image is hidden, be appeared, so that an undesirable or unnatural image can be avoided. As is described above, according to this embodiment, an excellent user interface can be provided.

A seventh embodiment of the present invention will now be described. In this embodiment, as in the sixth embodiment, the position for displaying the tiling development picture is limited to the lower portion of the screen, so that a user can easily identify a child picture for an entry program that is to be displayed through the tiling development process.

Specifically, in this embodiment, when the tiling development display is requested for the child picture 1 displayed in the upper portion of the screen, the positions for the display of the child pictures 1 and 2 are switched so that the child picture 1 is displayed in the lower portion and the child picture 2 is displayed in the upper portion of the screen, and the tiling development picture is displayed adjacently to the child picture 1.

The processing performed by the control unit 12 for this embodiment will now be described in detail. First, upon receiving a tiling development display request initiated by a user action, the control unit 12 determines whether the display position of the subjected child picture should be changed. That is, when the control unit 12 employs the priority level of the child picture recorded in the RAM 14 to ascertain that the display position of the child picture is in the upper portion of the screen, the control unit 12 thereafter determines that the display position of the child picture should be changed.

When, however, the control unit 12 ascertains that the display position of the child picture is in the lower portion of the screen, instead of changing the display position of the child picture, the control unit 12 needs only display the tiling development picture, by superimposing it on the part of the main picture image that is displayed in the lower portion of the display screen.

In this instance, for example, upon receiving the tiling development display request for the child picture, the control unit 12 controls the memory control units 7-2 and 7-3 to halt the updating of the video data in the memories 8-2 and 8-3. Through this process, the secondary moving images of programs #1 and #6, which are displayed in the child pictures 1 and 2, are captured, and still images thereof are displayed. Further, the control unit 12 controls the GUI generation unit 15 to draw the outer frame for the child picture 1 that is the subject of the tiling development display request.

Figure 17A:
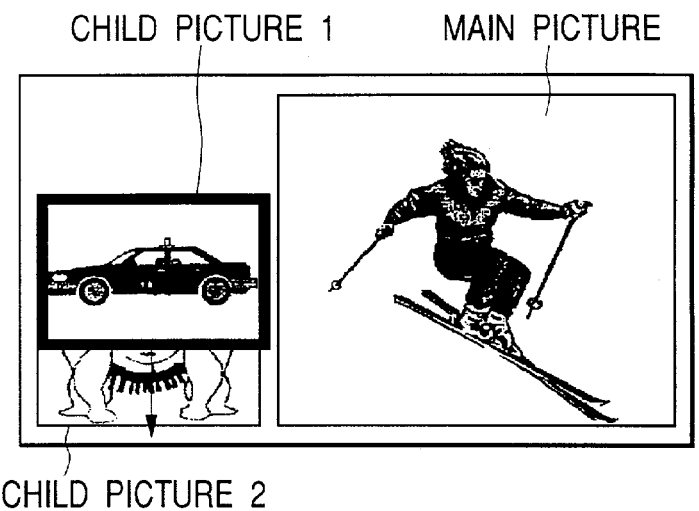
FIGS. 17A, 17B and 17C are diagrams showing an image representing the tiling development processing according to a seventh embodiment of the present invention.

The control unit 12 controls the synthesization unit 9 to set the display priority of the child picture 1 higher than that of the child picture 2, and to sequentially move the display position of the child picture 1 to the lower portion of the screen. As a result, the child picture 1 is moved to the lower portion of the screen and is superimposed on the child picture 2. The state wherein the display position of the child picture 1 is being moved is shown in FIG. 17A. As is shown in FIG. 17A, the background of the picture appears at the original display position of the child picture 1.

Figure 17B:
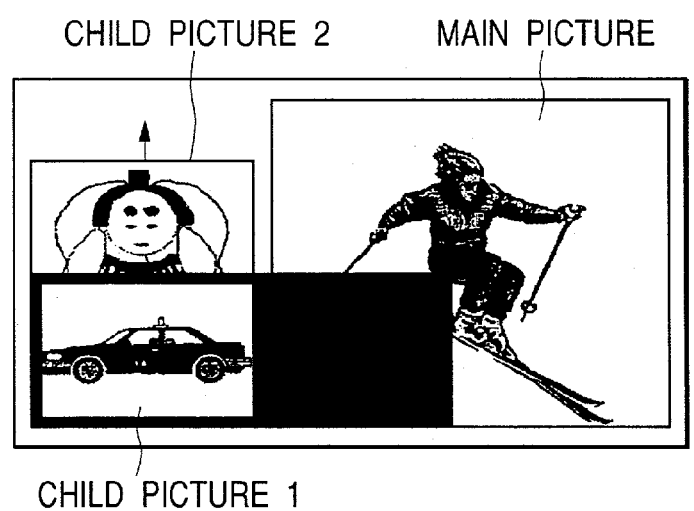
Figure 17C:
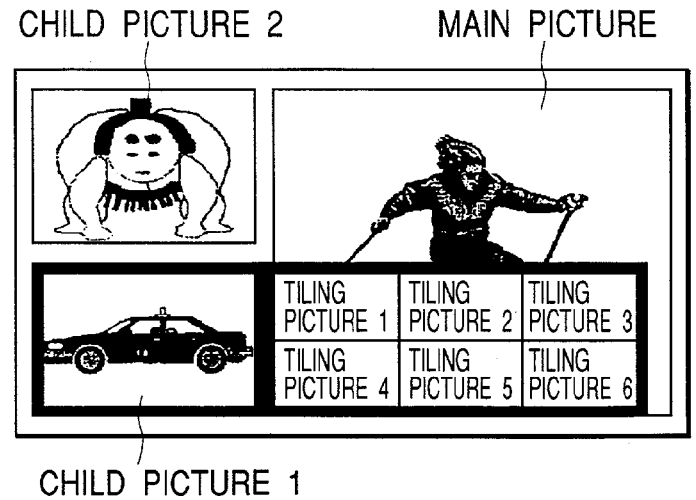

When the movement of the child picture 1 has been completed (when the child picture 1 is displayed while fully superimposed on the child picture 2), the control unit 12 controls the synthesization unit 9 to sequentially move the display position of the child picture 2 to the upper portion of the screen. Consequently, the child picture 2 is moved toward the upper screen portion (directed toward the position whereat the child picture was originally displayed). The state wherein the display position of the child picture 2 is being moved is shown in FIG. 17B.

While the display position of the child picture 2 is being moved, the control unit 12 displays the tiling development picture at the position adjacent to the child picture 1. Finally, the display positions of the child pictures 1 and 2 are exchanged and the tiling development picture is displayed adjacently to the child picture 1.

As is described above, since according to the embodiment the exchange of the positions of the child pictures 1 and 2 is not effected immediately but is sequentially performed, a user can visually apprehend the positions to which the child pictures 1 and 2 are moved. Further, since the tiling development picture and the child picture 1 are adjacently displayed in the lower portion of the screen, in addition to the effects obtained by the sixth embodiment, visually, it is easy to identify the destinations of the child pictures 1 and 2 and the attribute of the tiling development picture.

In the preceding embodiment, two child pictures are employed for the display. In the event, however, the number of child pictures is not limited to two; rather, a larger number is preferable. Similarly, in this embodiment, the exchange of display positions is initiated beginning with the movement of the display position of the child picture 1. However, the child pictures 1 and 2 may be moved at the same time, or during the exchange of the display positions, an a blending process may also be performed to render the child pictures 1 and 2 semi-transparent.

In addition, during the processing performed in this embodiment, the control unit 12 controls the memory control units 7-2 and 7-3 to capture and display still images produced by the entry programs of the child pictures 1 and 2. This control procedure, however, may not be employed, so that while the child pictures 1 and 2 are transposed, moving images are displayed therein. This same process can also be applied to the second embodiment.

It is preferable that the above embodiments be selected in accordance with the preferences of a user, or the positioning or the configuration of a product. Further, in the above embodiments, the child pictures, the programs and the channels have been explained using examples wherein the tuner receives multi-channel programs. The present invention, of course, is not limited to this, and various other image input sources may be accessed to obtain programs for entry in the child pictures and the tiling development picture.

For example, the present invention can also be applied to the usage in FIG. 5 wherein the tuner displays a program and accesses a channel for the child picture 1, and wherein, for the child picture 2, image information recorded on an HDD is displayed. Further, for the child picture 2, an image information index or image information read out from a DVD connected to the display device may be used.

Furthermore, in the above embodiments, two child pictures are employed for the displays. However, the present invention is not limited to this number; it can be applied to any number of child pictures and the same effects obtained.

The scope of the present invention also includes a configuration wherein, to achieve the functions of the embodiments, software program code that implements the functions of the embodiments is supplied to an apparatus or a system computer that is connected to various devices, and the devices are operated in accordance with a program stored in the apparatus or in the computer (a CPU or an MPU) of the system.

In this case, the functions of the embodiments are provided by the software program code, and the program code and means for supplying the program code to the computer, such as a storage medium on which the program code is stored, also constitute the present invention. The storage medium used for storing the program code can be, for example, a flexible disk, a hard disk, an optical disk, a magneto-optical disk, a CD-ROM, a magnetic tape, a non-volatile memory card or a ROM.

In addition, with the present invention it is not only possible for the functions of the previous embodiments to be provided through the execution of program code by a computer, but also, the program code can interact with an OS (Operating System) or another software application, running on a computer, to provide the functions described in the above embodiments.

Furthermore, the present invention covers the following arrangement. That is, program code read from a storage medium can be written in a memory that is mounted on a function expansion board inserted into a computer, or in a function expansion unit connected to the computer, and in consonance with instructions in the program code, a CPU mounted on the function expansion board, or in the function expansion unit, can perform part or all of the actual processing required to implement the functions of the above described embodiments.

As is apparent from the above explanation, according to the present invention, a tiling development picture is provided outside the display area of the child picture to display a list of programs having lower priority levels than the program that currently is being displayed in the child picture. Thus, a program having a lower priority level can also be easily identified without deterioration of the visibility of the program in the child picture.

Further, according to the embodiments, when the number of programs having lower priority levels is greater than the maximum number of segments in a tiling development picture, the program filtering process is performed based on the preferences of a user. As a result, in the tiling development picture, the user can select program pictures beginning with those that correspond to programs corresponding to the user's preferences.

Furthermore, according to the embodiments, since a shadow frame is provided for the tiling development picture, the boundary between the main picture and the tiling development picture is clearly delineated.

In addition, since according to the present invention the size of the main picture can be reduced, or the main picture can be restored when the tiling development picture is displayed, the visibility of the main picture, which is a subject picture, can be improved.

Moreover, according to the invention, even when the number of entry programs to be displayed in the tiling development picture is greater than the maximum number of segments in the tiling development picture, the switching and display of multiple tiling development pictures can be effected by employing a simple operation, and all the entry programs can be efficiently displayed.

Also, according to the present invention, a child picture in the upper portion of a screen is moved to the lower portion, and a tiling development picture is displayed adjacently to the child picture. Therefore, when the tiling development picture is displayed, the video for the main picture can be viewed without a user experiencing an oppressive sensation.

Many widely different embodiments of the present invention may be constructed without departing from the spirit and scope of the present invention. It should be understood that the present invention is not limited to the specific embodiments described in the specification, except as defined in the appended claims.

What is claimed is:

1. A control method for a multi-picture display apparatus capable of displaying a plurality of programs in a main picture and at least one sub-picture, comprising:
    a setting step of setting a plurality of entry programs capable of being displayed in one sub-picture, by giving a priority order to the entry programs;
    a layout step of laying out a plurality of tiling pictures for displaying the entry programs, on the main picture in accordance with the number of the entry programs in such a manner that the tiling pictures are adjacent to the sub-picture and do not overlap with each other; and
    a control step of displaying the entry programs in the tiling pictures in accordance with the priority order, and
    wherein the number of tiling pictures is equal to the number of entry programs which are not displayed in the sub-picture.

2. A control method according to claim 1, further comprising a filtering step of filtering the entry programs so that the number of entry programs is less than or equal to a maximum number of entry programs, which is set in advance.

3. A control method according to claim 1, wherein each of the main picture and the sub-picture effects moving image display, and wherein the tiling pictures effects still image capture display which is sequentially rewritable.

4. A computer-readable medium encoded with a computer program for causing a computer to execute the control method for a multi-picture display apparatus, as set out in claim 1.

* * * * *

UNITED STATES PATENT AND TRADEMARK OFFICE
CERTIFICATE OF CORRECTION

| | | |
|---|---|---|
| PATENT NO. | : 7,154,558 B2 | Page 1 of 1 |
| APPLICATION NO. | : 10/152022 | |
| DATED | : December 26, 2006 | |
| INVENTOR(S) | : Hideaki Yui et al. | |

Figure 4:
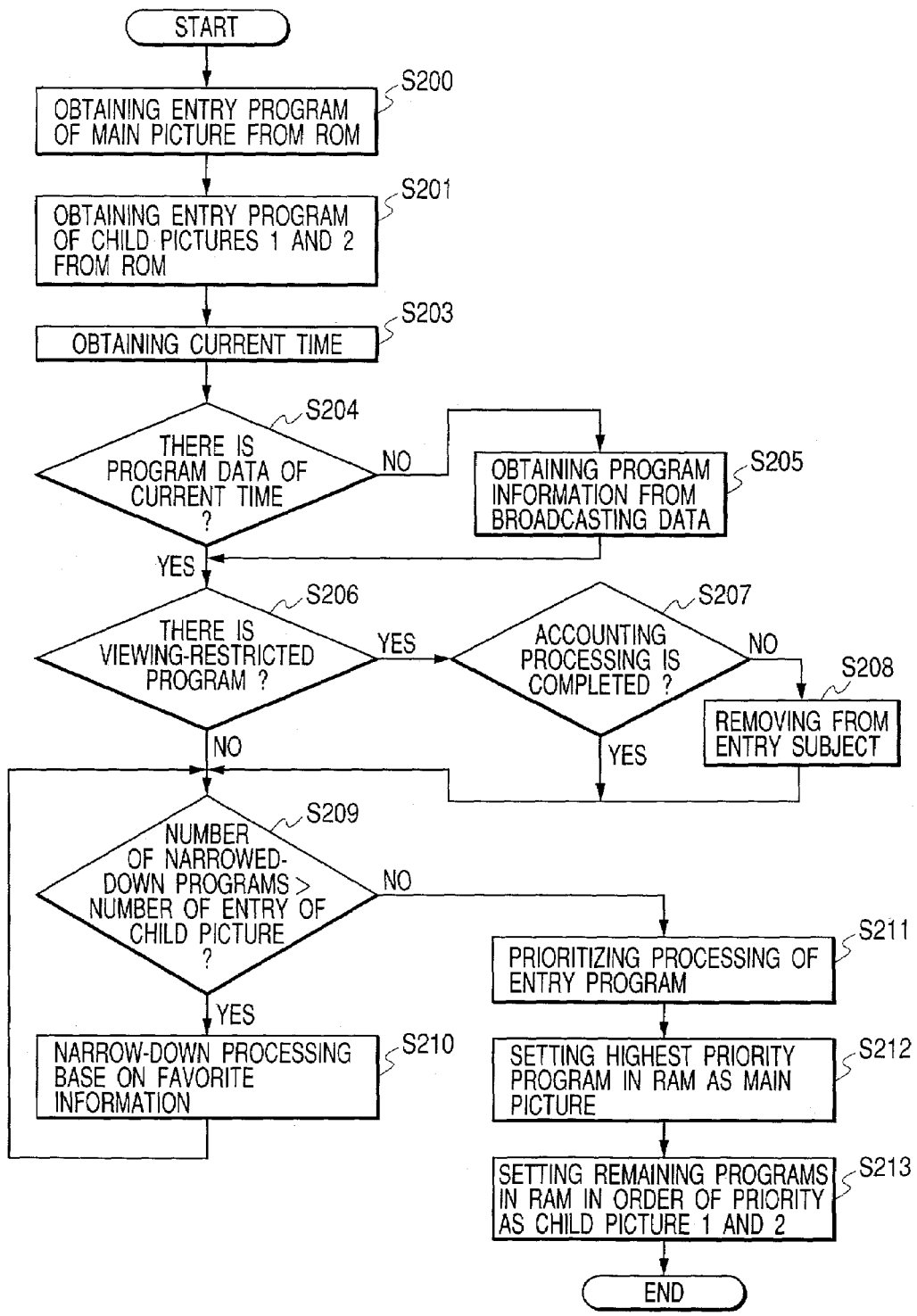
FIG. 4 is a flowchart showing the filtering processing performed by the multi-picture display apparatus according to the first embodiment of the present invention.

It is certified that error appears in the above-identified patent and that said Letters Patent is hereby corrected as shown below:

SHEET 5:

FIG. 4, "BASE" should read --BASED--.

COLUMN 4:

Line 64, "asynchronously." should read --asynchronous.--.

COLUMN 5:

Line 10, "of" should be deleted.

COLUMN 17:

Line 8, "restored" should read --is restored--.

COLUMN 20:

Line 59, "an a" should read --an α--.

COLUMN 22:

Line 59, "effects" should read --effect--.

Signed and Sealed this

Twentieth Day of May, 2008

JON W. DUDAS
*Director of the United States Patent and Trademark Office*